US007778606B2

(12) United States Patent
Ammon et al.

(10) Patent No.: US 7,778,606 B2
(45) Date of Patent: Aug. 17, 2010

(54) METHOD AND SYSTEM FOR WIRELESS INTRUSION DETECTION

(75) Inventors: Ken Ammon, Leesburg, VA (US); Chris O'Ferrell, Sterling, VA (US); Wayne Mitzen, Manassas, VA (US); Dan Frasnelli, Ashburn, VA (US); Lawrence Wimble, Crystal River, FL (US); Yin Yang, Herndon, VA (US); Tom McHale, Reston, VA (US); Rick Doten, Sterling, VA (US)

(73) Assignee: Network Security Technologies, Inc., Ashburn, VA (US)

( * ) Notice: Subject to any disclaimer, the term of this patent is extended or adjusted under 35 U.S.C. 154(b) by 2047 days.

(21) Appl. No.: 10/147,308

(22) Filed: May 17, 2002

(65) Prior Publication Data

US 2003/0217289 A1 Nov. 20, 2003

(51) Int. Cl.
*H04B 17/00* (2006.01)
*H04M 1/66* (2006.01)
*H04M 1/68* (2006.01)
*H04M 3/16* (2006.01)

(52) U.S. Cl. .................. 455/67.11; 455/410; 455/411

(58) Field of Classification Search ............... 455/410, 455/411, 404.1, 404.2, 457, 67.11, 9, 115.1
See application file for complete search history.

(56) References Cited

U.S. PATENT DOCUMENTS

| | | | |
|---|---|---|---|
| 4,792,946 A | 12/1988 | Mayo | |
| 4,951,029 A | 8/1990 | Severson | |
| 5,325,419 A | 6/1994 | Connolly et al. | |
| 5,539,824 A | 7/1996 | Bjorklund et al. | |
| 5,603,054 A | 2/1997 | Theimer et al. | |
| 5,737,318 A | 4/1998 | Melnik | |
| 5,784,298 A | 7/1998 | Hershey et al. | |
| 5,787,154 A | 7/1998 | Hazra et al. | |
| 5,796,832 A | 8/1998 | Kawan | |
| 5,812,865 A | 9/1998 | Theimer et al. | |
| 5,815,553 A | 9/1998 | Baugh et al. | |
| 5,854,985 A | 12/1998 | Sainton et al. | |
| 5,892,442 A | 4/1999 | Ozery | |
| 5,912,882 A | 6/1999 | Yafuso et al. | |
| 5,915,226 A | 6/1999 | Martineau | |
| 5,953,652 A * | 9/1999 | Amin et al. ............... 455/410 |
| 5,959,287 A | 9/1999 | Myers et al. | |
| 6,009,247 A | 12/1999 | Canora et al. | |
| 6,014,557 A | 1/2000 | Morton et al. | |

(Continued)

OTHER PUBLICATIONS

Kim et al., "Design of Network Security Control System for Cooperative Intrusion Detection," Feb. 2002, Springer-Verlag Berlin Heidelberg, p. 389-398.

(Continued)

*Primary Examiner*—Eugene Yun

(57) ABSTRACT

A wireless intrusion detection system (WIDS) is disclosed for monitoring both authorized and unauthorized access to a wireless portion of a network. The WIDS consists of a collector and one or more nodes that communicate via an out of band means that is separate from the network. Unauthorized access points and unauthorized clients in the network can be detected. The WIDS can be used to monitor, for example, a network implemented using the 802.11 protocol. In addition, the WIDS can be used by one company to provide a service that monitors the wireless network of another company.

27 Claims, 10 Drawing Sheets

U.S. PATENT DOCUMENTS

| | | | |
|---|---|---|---|
| 6,014,558 A | 1/2000 | Thomas | |
| 6,028,551 A | 2/2000 | Schoen et al. | |
| 6,028,933 A | 2/2000 | Heer et al. | |
| 6,049,710 A | 4/2000 | Nilsson | |
| 6,081,601 A | 6/2000 | Raivisto | |
| 6,088,450 A | 7/2000 | Davis et al. | |
| 6,088,804 A | 7/2000 | Hill et al. | |
| 6,102,284 A | 8/2000 | Myers et al. | |
| 6,104,785 A | 8/2000 | Chen | |
| 6,134,453 A | 10/2000 | Sainton et al. | |
| 6,141,544 A | 10/2000 | Corriveau et al. | |
| 6,149,353 A | 11/2000 | Nilsson | |
| 6,195,547 B1 | 2/2001 | Corriveau et al. | |
| 6,230,002 B1 | 5/2001 | Floden et al. | |
| 6,252,883 B1 | 6/2001 | Schweickart et al. | |
| 6,281,790 B1 | 8/2001 | Kimmel et al. | |
| 6,285,318 B1 | 9/2001 | Schoen et al. | |
| 6,298,250 B1 | 10/2001 | Nilsson | |
| 6,300,902 B1 | 10/2001 | Eslambolchi | |
| 6,308,053 B1 | 10/2001 | Nilsson | |
| 6,310,549 B1 | 10/2001 | Loftin et al. | |
| 6,317,831 B1 | 11/2001 | King | |
| 6,327,570 B1 | 12/2001 | Stevens | |
| 6,362,736 B1 | 3/2002 | Gehlot | |
| 6,487,666 B1 | 11/2002 | Shanklin et al. | |
| 6,947,726 B2 * | 9/2005 | Rockwell | 455/411 |
| 2003/0151513 A1 | 8/2003 | Herrmann et al. | |
| 2003/0188190 A1 | 10/2003 | Aaron et al. | |
| 2003/0217283 A1 | 11/2003 | Hrastar et al. | |
| 2004/0008652 A1 | 1/2004 | Tanzella et al. | |

OTHER PUBLICATIONS http://www.mpirical.com/companion/IP/BSSID_-_Basic_Service_Set_Identifier.htm, visited: Nov. 19, 2004.

Bardwell Joe: "Assessing wireless Security with AirPeek" Internet Citation, [Online] Jan. 13, 2002, pp. 1-5, XP002406414 Retrieved from the Internet: URL:http://www.packetnexus.com/docs/AiroPeek_Security.pdf>.

Ragsdale D J et al: "Adaptation techniques for intrusion detection and intrusion response systems" Systems, Man, and Cybernetics, 2000 IEEE International Conference on Nashville, TN, USA Oct. 8-11, 2000, Piscataway, NJ, USA,IEEE, US, vol. 4, Oct. 8, 2000, pp. 2344-2349, XP010523501 ISBN: 0-7803-6583-6.

Zhang et al., "Intrusion Detection in Wireless Ad-Hoc Networks," Proceedings of the 6th International Conference on Mobile Computing and Networking (MobiCom 2000), Boston, Massachusetts, Aug. 2000, pp. 275-283.

Zheng, Shan, et al., "A Network State Based Intrusion Detection Model," Computer Networks and Mobile Computing, 2001. Proceedings. 2001 International Conference on, vol., Iss., 2001, IEEE, p. 481-486, Oct. 16-19, 2001.

* cited by examiner

METHOD AND SYSTEM FOR WIRELESS INTRUSION DETECTION

BACKGROUND

1. Field

The present invention relates generally to network security techniques, and more specifically to wireless intrusion detection in data networks employing wireless local area network (WLAN) technology.

2. Background

The Institute for Electrical and Electronic Engineers approved the "Standard For Information Technology; Telecommunications and information exchange between systems-Local and Metropolitan networks-Specific requirements; Part 11: Wireless LAN Medium Access Control (MAC) and Physical Layer (PHY) specifications: Higher speed Physical Layer (PHY) extension in the 2.4 GHz band" (known as 802.11b) for the development of products to allow computers and other devices to connect to wired Local Area Network (LAN) segments not with wires, but by using radio-based network interface cards (NICs) working in the public 2.4 GHz range. Such wireless access to a wired LAN is often referred to as a wireless network.

As a result of the 802.11 standard, many network products were developed that provide access points that are wired into a LAN segment and provide access to the network for the wireless client computers using these radio-based NICs. Because wireless connectivity can span outside the physical control of a building, the current physical security measures that attempt to prevent unauthorized access to a LAN are no longer effective. By using a Service Set Identifier (SSID), only those attempts to access the wireless network that use the same SSID on the client cards as is on the access point will connect. The SSID does not provide security, however, only identification. The SSID is sent in an unprotected fashion by both the access point and the clients, and can be easily captured and exploited.

Security measures were incorporated into the 802.11b protocol, including Wired Equivalent Privacy (WEP) data encryption and shared secret passwords. The shared secret passwords provide limited protection and are rarely used. WEP relies on a shared password used by the access point and the clients to encrypt the payload data of the transmission, but does not encrypt the header and other information about the communication. Further, WEP was developed before the export restrictions were lifted on encrypted algorithms. Because of this, WEP was only designed to use 40 bit keys and was not cryptographically complex. After the export restrictions were lifted, a 104-bit version was implemented. Unfortunately, this "stronger" version still used a flawed crypto implementation. It was not long before white papers were written describing how the WEP key could be broken. Soon after that, products appeared that could assist in breaking WEP.

The use of 802.11x wireless networks (where 802.11x refers to any of the 802.11 standards that define wireless protocols, including, for example, 802.11b and the recently released 802.11a) has grown significantly. This, coupled with the availability of low cost equipment in the consumer market, has raised many questions for IT department administrators about whether or not to implement a wireless network, and, if so, how to implement one. Many computer security policies likely preclude the utilization of any wireless network tied into the main network wiring. Others allow limited use for the convenience of their employees, but dictate strict security settings.

Contrasting this, certain industries necessitate the deployment of wireless networks. For instance, the sheer size and topology of an overnight package delivery company such as Federal Express requires the use of handheld wireless nodes in their day-to-day operations. Typically, most early wireless networks employed by companies such as this were proprietary. But due to the increase in available hardware and software, and due to the increased performance and ease to which 802.11x networks can be integrated into existing IT infrastructures, many companies such as Federal Express are switching to the commercially available systems.

In most situations, wireless breaches of wired networks go unnoticed. Unlike the plethora of security devices/services available for the wired network infrastructure few tools exist for the system administrator to detect wireless intrusions.

One security issue with wireless networks is the fact that it is inexpensive and easy to install a new wireless access point onto an existing wired network. This could open an otherwise secure network to outsiders. Many current wireless intrusion detection products work by monitoring the wired network for access points. This requires their use on every separate segment of the network, since each separate network segment would need to be monitored individually. Also, current solutions do not identify any client machines that are attempting to access the wireless LAN.

There is therefore a need in the art for a wireless intrusion detection system and method that overcomes the above problems by providing a non-intrusive, robust, and transparent wireless intrusion detection capability.

SUMMARY

In accordance with the present invention, a wireless intrusion detection system (WIDS) and method performs monitoring of wireless networks (including at least one wireless network being protected, known as the wireless network of interest), stores the results of that monitoring, processes the results to determine whether any unauthorized access of the wireless network of interest has occurred, and notifies users of the results and the processing. Furthermore, the WID system includes one or more WIDS nodes (including at least one primary WIDS node) for monitoring a particular geographic area, and a WIDS collector for collecting from the primary WIDS node the information monitored by all of the nodes. According to an embodiment, the WID system utilizes an out-of-band method of communication to ensure accurate and timely delivery of information, and to provide security to the communications between the nodes and the collector. In an embodiment, 900 MHz radios provide a wider area of coverage than the 802.11x networks being monitored and provide resistance to denial-of-service methods that would affect the 802.11x bands. The WID system also utilizes a beaconing method for controlling the communications between the collector and the nodes. Information about a network collected by a WIDS can include tracking of authorized and unauthorized access points and clients, locating any unauthorized devices, determining the status of any authorized access points, determining whether any authorized access points have changed, determining whether any authorized access points are not operating, identifying any denial of service (DoS) attempts, tracking of multiple connection attempts to the wireless network by any unauthorized devices, tracking how long any unauthorized device has attempted to access the wireless network, and identifying attempts to spoof an authorized access point. Based on such occurrences, in one embodiment adaptive learning techniques can be utilized to recognize patterns in the occurrences. In accordance with the present invention, a WID system can be operated by a company to provide, via a contractual relationship, the service of remotely monitoring a wireless network of another company.

DETAILED DESCRIPTION

Figure 1:
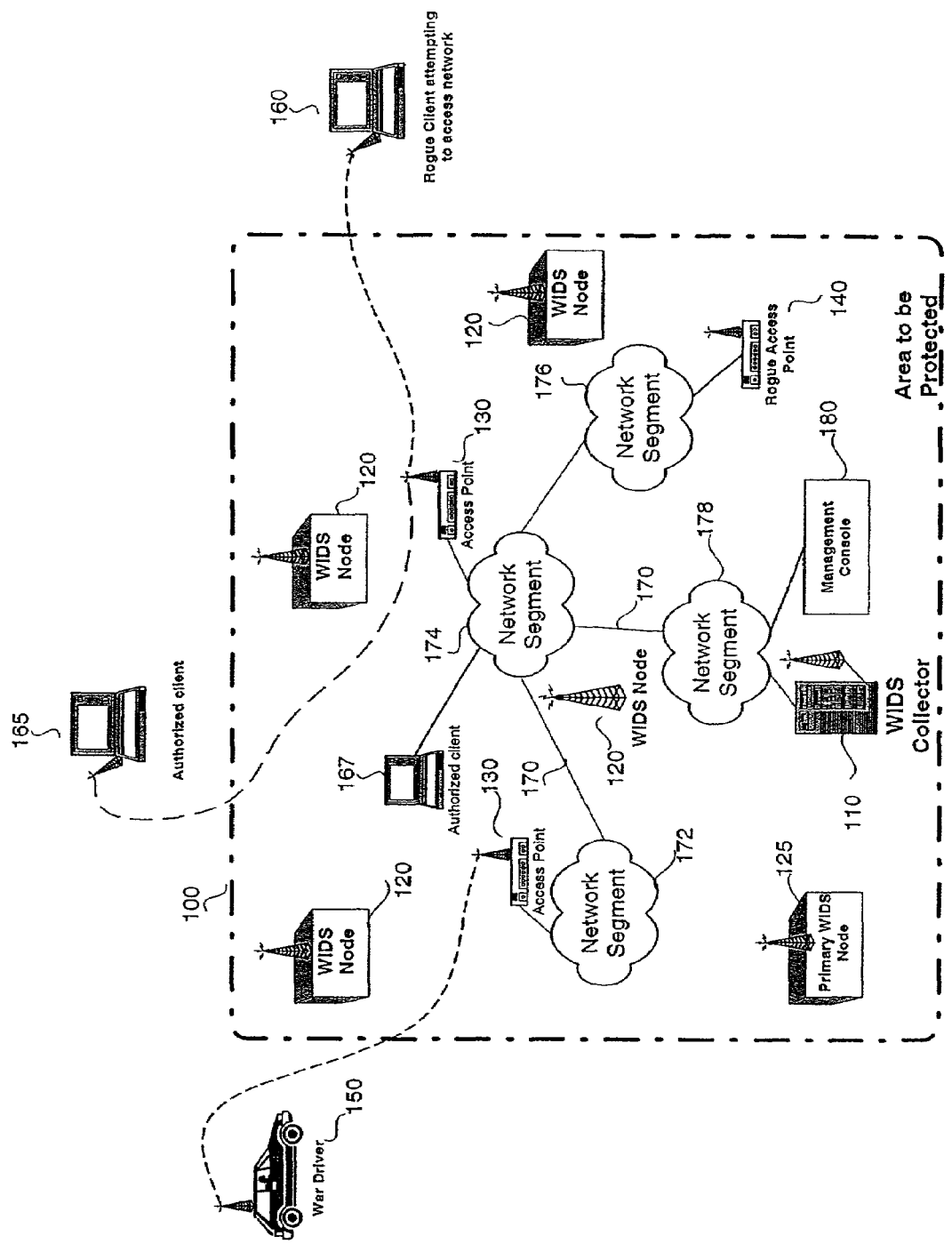
FIG. 1 is a diagram of a wireless network containing a WID system according to the present invention.

FIG. 1 depicts a wireless network containing an intrusion detection system (IDS) particularly focused on wireless events, according to the present invention. Such a wireless intrusion detection system (WID system or WIDS) monitors a specific geographic area to discover both authorized and unauthorized access points and authorized and unauthorized client machines that may be trying to connect to the wireless network. These access points and client machines are, collectively, wireless access devices. In one embodiment, the WID system has two functional parts: one or more WIDS nodes that collect data from access points and clients; and one or more WIDS collectors that collect the raw data from the WIDS nodes using an out-of-band means. The raw data (e.g., intrusion and status information) from the nodes can be stored in a database for access by a local web based management console, or sent to any Simple Network Management Protocol (SNMP) client software by the WIDS collector.

In general, the number of nodes required for a WID system is based on the size of the area to be protected. The nodes, however, utilize passive detection so they are not easy to detect by an attacker. In addition, the out-of-band communications between the nodes and collector are encrypted, providing even further security.

The WID system in FIG. 1 is made up of WIDS collector 110 and a number of WIDS nodes 120. As a result of the initialization process that will be described in more detail below, at least one WIDS node 120 is designated as a primary WIDS node 125. Each WIDS node 120 that is not a primary WIDS node is also known as a secondary WIDS node. Primary WIDS node 125 communicates with other WIDS nodes 120 and WIDS collector 110 using a proprietary dynamic wireless protocol. Each WIDS node 120 along with primary WIDS node 125 provides wireless intrusion detection over a particular geographic area within the overall area 100 to be protected.

Authorized access to the wireless network can occur through various access points 130 that allow wireless devices to access local area network (LAN) 170, to which access points 130 are attached. An authorized wireless client 165 can access the LAN via the wireless network through an access point 130 and have the same (or similar) usage of the wired network as an authorized client 167 connected to the LAN via a wired connection.

In addition to access points 130 within LAN 170 that have been authorized, an additional rogue access point 140 is shown in FIG. 1 that could be used for unauthorized access to the network. Additionally, unauthorized access to the LAN through the wireless portion of the network can occur via war driver 150 or rogue client 160.

Rogue access point 140 could be an access point enabled by an authorized employee or could be an access point that an attacker has somehow installed on LAN 170. War driver 150 includes any well known approach for accessing wireless networks using "drive-by" techniques in which a person utilizes a wireless-enabled portable device to access unprotected wireless networks.

LAN 170 in FIG. 1 is a typical local area network, consisting of interconnected network segments 172, 174, 176, and 178. As will become apparent, the WID system can provide various types of information about attempts to access a wireless network. Such information is communicated to a user via management console 180 that can, for example, be running in the user's facility. Management console 180 can provide information on:

tracking of authorized and unauthorized access points and clients;

location of unauthorized devices;

changes to configurations of known and authorized access points;

health of WIDS nodes;

denial of service (DoS) attempts;

tracking of multiple connection attempts by unauthorized devices over a period of time;

tracking how long an unauthorized device has attempted to access the network; and attempts to spoof an authorized access point.

In an embodiment, management console 180 can be implemented over a Secure Sockets Layer (SSL) encrypted web interface, as would be apparent. In addition, the management console is, in an embodiment, SNMP compatible and so can be used with features found in typical remote SNMP management software (including, for example, the OpenView software suite from Hewlett Packard) to notify the user via electronic mail (e-mail) or any other notification mechanisms. Additionally, the management console can provide multiple user authorization levels, allowing different people within an organization to have differing levels of access to the information in the WID system.

WIDS nodes 120 are loaded with software capable of inferring wireless network electromagnetic characteristics unique to the particular network configuration as deployed. In one embodiment, the location of each WIDS node is, at time of deployment, calibrated using known information from the wireless network of interest. Calibration input types can include, for example, measured distance to known stationary calibration point, signal and noise levels, and other variables as appropriate. Location of an intrusion of the wireless network can be determined more accurately by applying a neural network or genetic algorithm to historical signal strength statistics collected from continuous input, as would be apparent.

WIDS collector 110 contains software that determines the proximity and approximate location of an event source to the WIDS node by implementing known algorithms to spatial coordinates and wireless signal characteristics. In one embodiment, geographic coordinates collected at linear intersections of a structure or coverage area are applied to a rectangular grid overlaid on a representation of the blueprint or spatial area. Using basic cartographic methods, geographic coordinates corresponding to WIDS nodes deployed on a campus, structure or other coverage area may be obtained. In one embodiment, triangulation methods may be used to calculate approximate position given signal information and coordinates.

Figure 2:
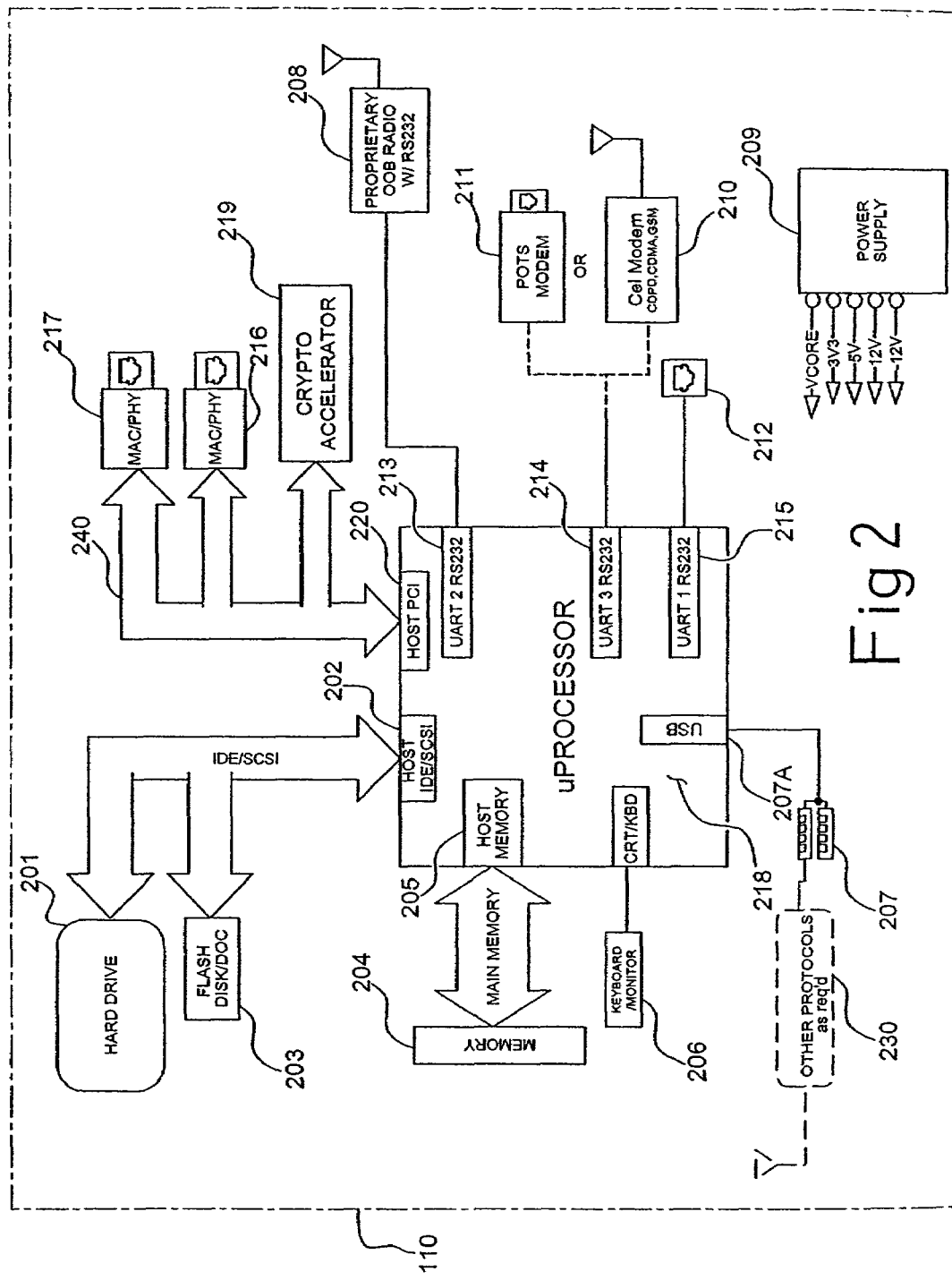
FIG. 2 is a hardware block diagram of a WIDS collector.

In FIG. 2, a WIDS collector 110 according to one embodiment of the present invention includes a host processor 218, flash based storage media 203, and a typical mechanical hard drive 201. Hard drive 201 could, for example, be a SCSI or IDE hard drive accessible over host port 202. Host processor 218 is also supported by memory 204 connected to a controller for the host 205, and a man-machine interface (MMI) (shown in this example as keyboard and monitor 206). Additional human interface is provided by RS232 compliant universal asynchronous receiver transmitter (UART) 215 connected to serial terminal connector 212. Power supply 209 provides power for the main subsystem and support components.

Figure 3:
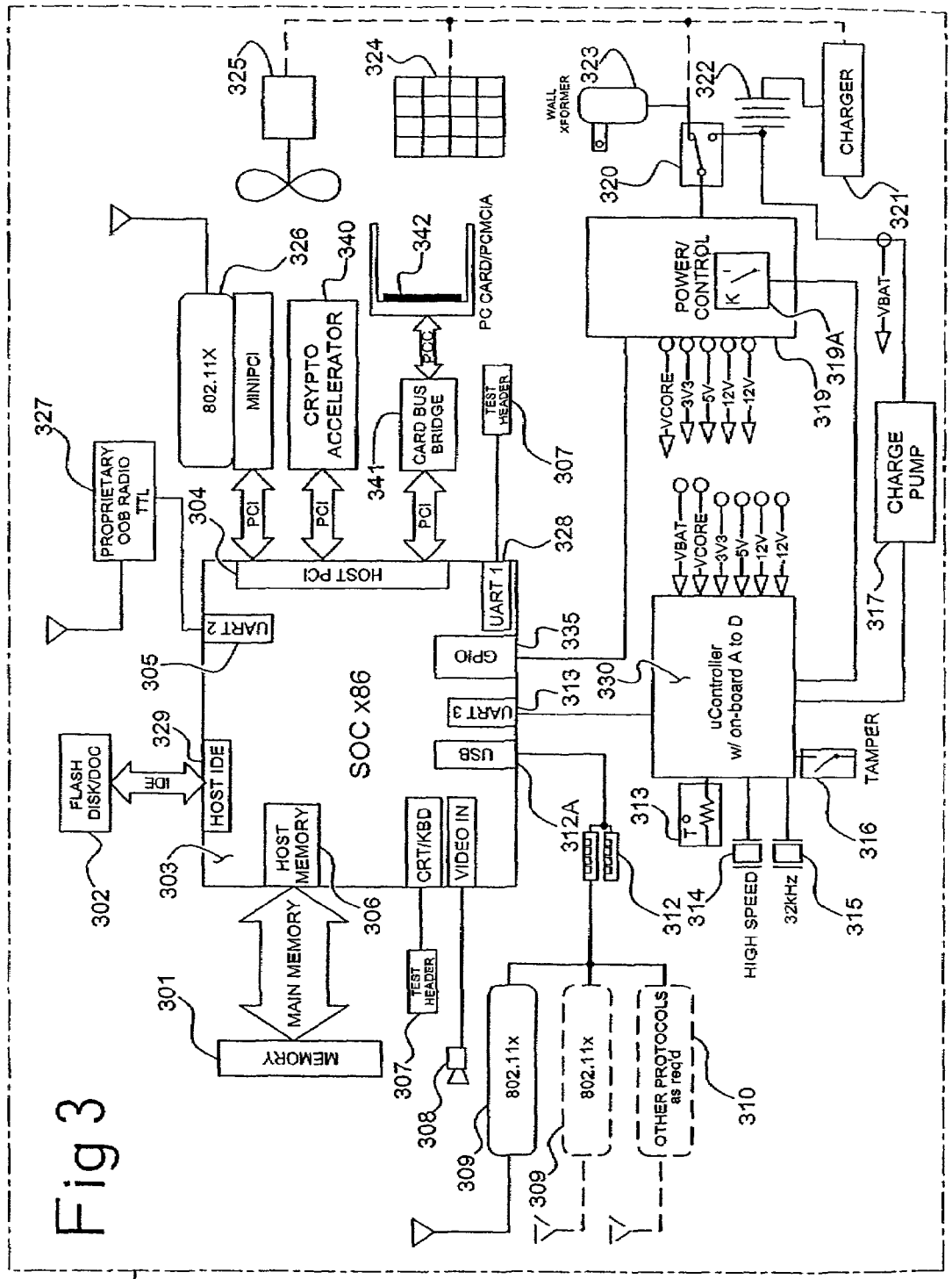
FIG. 3 is a hardware block diagram of a WIDS node.

The communications link between WIDS collector 110 and WIDS nodes 120 uses a proprietary out-of-band radio 208 connected to a standard RS232 UART port 213 of host processor 218. In this particular implementation, out-of-band radio 208 contains the necessary level shift required for 10-12V signaling and is protocol and RF interoperable with out-of-band transistor-transistor logic (TTL) radio 327 of WIDS node 120 (as shown in FIG. 3).

In addition, communication means 230 is provided to allow WIDS collector 110 to communicate with WIDS nodes 120 using other radio protocols. These protocols could, for example, include new technologies such as ultra wideband (UWB), or other narrow band and spread spectrum devices. Connection of other radio devices using other radio protocols over communication means 230 in this embodiment is via standard universal serial bus (USB) ports 207A and USB host connector 207, though other I/O such as the host expansion bus 240 could be used.

Connection of WIDS collector 110 to a wide area network (WAN) or monitoring facility is accomplished via an expansion bus shown here as host expansion bus 240 using either the Media Access Controller (MAC) or Physical Interface (PHY) of the main NIC interface 217 or the ancillary NIC subsystem 216, as would be apparent. Additional connectivity to the WAN is provided by a modem 211 or a cellular connection 210 via another UART 214. Other WAN connections could also be used as they become available and interfaced using any other expansion interfaces.

For protection of the data transmission between WIDS collector 110 and WIDS nodes 120 a cryptographic accelerator 219, such as those offered by Broadcom and HiFn, is provided, shown here using host expansion bus 240 to communicate with host processor 218 over host PCI port 220.

As shown in FIG. 3, WIDS node 120 consists of a low power embedded processor 303. Many processor architectures are available as embedded devices with ARM and x86-based devices being readily available. In an embodiment, an x86-based system-on-chip (SOC) device such as National Semiconductor Geode SC2220 was selected as embedded processor 303. Since this is an embedded device, a flash disk 302 is connected to host IDE port 329, which can, as would be apparent, allow for firmware updates of WIDS node 120. Other flash-based storages such as disk on chip (DOC) or compact flash could also be used. Memory 301 interfaces to embedded processor 303 via host memory interface 306, as would be apparent. Test headers 307 are provided on the CRT and keyboard ports as well as the console UART 328. In this instance, a camera input is provided by embedded processor 303 for optional camera 308 connections. This can be used to provide such things as visual verification and video capture for later prosecutions of suspected intruders, along with any other purposes that would be served by having video information.

Power for WIDS node 120 is provided by the power/control subsystem 319 that can be "shore powered" with alternating current (AC) using a typical wall transformer 323. Battery operation or backup can be maintained via a rechargeable cell 322 and charging system 321. Full time battery operation can be selected using jumper 320. Charge voltage and current can be from wall transformer 323, or via solar panels 324 and/or small windmill 325 to eliminate wiring requirements in outdoor locations.

During battery operation, power management can be achieved using a small microcontroller 330, such as the Microchip 16C74. This particular device provides a very low power standby mode using 32 kHz watch crystal 315 for sleep mode and high speed crystal 314 for normal, full power operation. Microcontroller 330 controls the main power supply 319 via relay control 319A. During sleep mode, microcontroller 330 receives power via low quiescent charge pump 317 directly from rechargeable cell 322. Control of power/control unit 319 is also available via the SOC General Purpose I/O (GPIO) port 335.

Microcontroller 330 also provides engineering data for remote WIDS node 120 using the eight on-board analog-to-digital (A/D) converters. For example, case temperature is provided to the microcontroller 330 A/D converters using a thermistor 313. Case tamper information is provided via the tamper mechanism 316, also connected to the microcontroller 330 A/D's since it is always on, even during sleep mode. This data, in addition to other diagnostic info such as supply voltages and battery charge, are monitored and sent to embedded processor 303, in this example, via the UART 313. This information is relayed to the WIDS collector 110 to monitor the health (or status) of the remote WIDS node 120.

WIDS node 120 connectivity to WID controller 110 is provided using the aforementioned proprietary out-of-band radio protocol. Proprietary TTL-level out-of-band radio 327 connects to embedded processor 303 via UART 305. Other protocol radios 310 can be used for both the out-of-band function or as additional monitoring interfaces.

Another method for connection of the typical wireless LAN network interface card (NIC) is provided by a multitude of possible interfaces. Multiple USB WLAN devices 309 are connected using USB port 312A on embedded processor 303 via connector 312. As higher speed WLAN devices become available, connection to the host embedded processor 303 expansion bus, in this case the host PCI 304, affords higher data rate WLAN devices 326 shown here using the MINIPCI form factor. Additionally, provision is made for connection of Card Bus/PCMCIA style of WLAN devices using Card Bus bridge 341 and Card Bus/PCMCIA connector 342.

WIDS node 120 encryption processing is shown as being provided by a dedicated cryptographic accelerator 340 connected to the host PCI bus 304 of embedded processor 303. This off loads the processing of encrypted data from the host embedded processor 303.

As described above with reference to the WID system in FIG. 1, the WID system consists of a central administrative and analysis component (i.e., WIDS collector 110) and multiple wireless data acquisition components (i.e., WIDS nodes 120). WIDS collector 110 to WIDS node 120 communications and WIDS node 120 to WIDS collector 110 communications occur across an out-of-band packet radio network. In one embodiment, a 900 MHz radio network is used for the out-of-band communications. To accommodate potential radio interference and increase scalability, any WIDS node 120 may act as the primary data communications proxy (i.e., primary WIDS node) for other WIDS nodes (the other WIDS nodes being called secondary WIDS nodes or nodes).

A WIDS trap service describes a simple TCP service present on all WIDS nodes 120 (including primary WIDS node 125) and WIDS collector 110. This service functions to forward data to the appropriate software subsystems. This service provides to the WID system a method of encrypted data transport between WIDS nodes 120 and primary WIDS nodes 125, and primary WIDS nodes 125 and WIDS collector 110. This service is responsible for the communication of all WIDS packet types, in one embodiment to include configuration, diagnostic, and health. The WIDS trap service also transfers unencrypted packet payloads to parser component for further processing or analysis, as appropriate.

A WIDS parser component describes a simple utility present on all WIDS nodes 120 (including primary WIDS node 125) and WIDS collector 110 which communicates received data to appropriate operating system or application components. In one embodiment, the WIDS node parser implementation receives unencrypted packets of type configuration from the WIDS trap service. Packets of type "configuration" contain specific instructions to update WIDS node system files, software, device firmware, and other critical components as appropriate. The WIDS collector parser implementation receives unencrypted packets of type "diagnostic" and "event" from collector WIDS trap service. In one embodiment, a WIDS collector parser applies basic formatting to the data and forwards the resulting information to a MySQL database service or SNMP-capable enterprise management software.

In an embodiment, a WIDS Communication Protocol (WCP) defines a communications method between WIDS nodes 120 and WIDS collector 110. The primary network service associated with these communications is referred to as the "Trap Service", as described above. WCP is an application-layer transmission control protocol (TCP) that provides communications between node and collector Trap Service daemons via Generalized Radio Internet Protocol (GENRIP) packets that have been encrypted with Advanced Encryption Standard (AES). A pre-loaded "customer key" is used to encrypt configuration, initialization, and key exchange packets. A unique "session key" generated by WID collector 110 is used to encrypt event and health packets for each instance of WID node 120. In an embodiment, both the customer key and session key are 256-bit keys, but other key lengths can be used for either key.

The WCP defines at least four different types of packets, each of which is described in further detail below. In general, a generic packet type contains information that defines the packet as a WCP packet and provides common information for all packet types; a diagnostic packet type contains data regarding the status of the WIDS nodes; an event packet type contains information regarding events that have occurred in the wireless network; and a configuration packet type contains information regarding the system configuration, including software versions, applications, and operating system information.

TABLE 1

WCP generic packet

IP | TCP | HEADER | TIMESTAMP | TYPE | PACKET

In an embodiment, the fields in the generic packet type have the structure shown in Table 1. The generic packet is a component of all other WCP packets, and uniquely identifies them as being WCP packets. The generic packet is used between the collector and primary WIDS nodes, and between the primary and secondary WIDS nodes (i.e., throughout the WID system). The main function of the generic packet is to identify the packet as a WCP packet. The HEADER field has a length of 16 bits and contains the static value of 0x4E53, providing the WCP packet identification.

The TIMESTAMP field in the generic packet ensures that each packet has a timestamp associated with it. This can be used for a number of purposes, including, for example, to preserve the time of particular events that will allow resolution of issues related to latency caused by network congestion. In an embodiment, the value placed in the timestamp field is provided by a POSIX 0.1 time( ) system call. The type field in the generic packet, in one embodiment of the WCP, is an 8-bit value that indicates to the trap service how to process the packet or specifies to which subsystem that packet belongs.

TABLE 2

WCP diagnostic packet

WCP | Tcpu | Tsys | V0 | V1 | V2 | V3 | BATT | CHECKSUM | RESERVED

The diagnostic packet type (with a TYPE value of 0x01 in an embodiment) shown in Table 2 is sent from the secondary WIDS nodes to the primary WIDS nodes, and the primary WIDS nodes pass it on to the collector, both communications using 256-bit AES encryption and a session key that will be described in further detail below. The WCP field in the WCP diagnostic packet contains a WCP generic packet, as described above, to provide the basic information to the recipient of the packet.

The diagnostic packet communicates status data from the secondary WIDS nodes to the primary WIDS nodes, including, for example, temperature, battery life, and voltages. Once the collector receives this diagnostic data on all nodes from the primary WIDS nodes, the collector can determine the system status. Once the system status has been evaluated by the collector, it can cause various courses of action to be taken that are appropriate in light of the received data. For example, if the collector determines that the battery life of a particular node is very short, the collector can send out a message to a system operator notifying the person that the batteries need to be changed.

As shown in Table 2, there are a number of fields in the diagnostic packet in one embodiment. The Tcpu, Tsys, V0, V1, V2, V3, and BATT fields are each 8-bit fields that provide information related to the health of the particular node. The Tcpu value indicates the temperature of the CPU. The Tsys value indicates the ambient temperature of the WIDS node inside the case. The V0, V1, V2, and V3 values each indicate the level of a different voltage source. The V0 value indicates the voltage level on the 2.5VDC supply, the V1 value indicates the voltage level on the 3.3VDC supply, the V2 value indicates the voltage level on the 5.0VDC supply, and the V3 value indicates the voltage level on the 12.0VDC supply. The BATT field provides an estimate of the percentage of battery life left.

The checksum field in the diagnostic packet can be used to provide host-based tamper detection and session hijacking detection. In an embodiment, the checksum can be a cryptographic hash value generated from unique system variables, thereby providing data integrity. For example, a hash could be computed from combining the IP address of the radio, the unique serial number of the Geode processor, and a media access control (MAC) address unique to the node, as would be apparent.

Finally, the RESERVED field in the diagnostic packet can be used for monitoring future events or functionality. For example, individual bit flags could be defined for indicating particular types of tampering.

Table 3

WCP event packet

WCP | CLASS | SRC | DST | CHANNEL | SSID | WEP | SNR | RESERVED

The WCP event packet (with a TYPE value of 0x02 in an embodiment) depicted in Table 3 communicates events that occur in the wireless network from secondary WIDS nodes 120 to primary WIDS node 125, and then back to WIDS collector 110, using 256-bit AES encryption and a session key that will be described in further detail below. The WCP field in the WCP diagnostic packet contains a WCP generic packet, as described above, to provide the basic information to the recipient of the packet.

The CLASS field in the event packet is a 6-bit field identifying the class and subclass of packet received by the WID node. In one embodiment, this field describes the packet as one of 802.11b packet classifications Management, Control and Data. Associated sub-classes of packet type Management in this embodiment may indicate 802.11b link-layer mechanisms such as Association, Authentication, Probe, Beacon and others, as are apparent.

The SRC field in the event packet is, in one embodiment, a 48-bit field that contains the MAC address of devices detected during data collection performed by WID nodes 120 in the WID system. In an 802.11 wireless network, for example, the value in the MAC field could correspond to the MAC addresses of detected clients or access points. Upon receipt of the event packet, WIDS collector 120 can determine the significance of the received MAC addresses.

The DST field in the WCP event packet is a 48-bit field containing the MAC address of devices for which the detected event is destined. In an embodiment deployed for 802.11 technologies, this value applies to the wireless interface of an access point, broadcast address (ff:ff:ff:ff:ff:ff) or wireless interface of a client supporting ad-hoc mode, as would be apparent.

The SSID field in the WCP event packet is a 256-bit service set identifier of access points. This field allows a determination of specific information about a particular device, such as the name of an access point. This can be used to help identify whether the device is a known device or an unknown device. Further information on the SSID can be found in Section 7.3.2.1 of IEEE std. 802.11b.

The CHANNEL field in the WCP event packet is an 8-bit value that indicates the channel on which the event was detected. For example, in the 802.11b protocol, channels 1 through 11 are used in the United States, channels 1 through 13 are used in Europe, and channel 14 is used in Japan. Thus, the CHANNEL field in a WID system for 802.11 would contain the channel number being used by the access point or client in the 802.11 wireless network. To maintain applicability of this field to new and emerging wireless network technologies, possible data values exceed those described by an 802.11b network embodiment.

The WEP field in the WCP event packet is a 4-bit value that indicates whether Wired Equivalent Privacy (WEP) has been enabled. WEP is a security protocol that utilizes encryption to protect 802.11 transmissions, as would be apparent. In one embodiment, the first bit indicates whether WEP is enabled on the detected wireless device while the remaining bits are reserved. This field could also be used, in another embodiment, to indicate the version of the 802.11 protocol being implemented in the wireless network of interest (e.g., 802.11b, 802.11a, or 802.11g).

The SNR field in the WCP event packet is an 8-bit value that indicates the Signal-to-Noise Ratio (SNR) of the particular event. The SNR value is calculated by the software in the WCP node that controls the 802.11 chipset. In one embodiment the signal and noise levels are collected by the firmware of the 802.11 interface and passed to the application through a software driver interface. The SNR field would then indicate the signal strength in dBm.

The RESERVED field in the WCP event packet is a 64-bit field that is reserved for future development and expansion. Potential uses include, for example, the mode of operation of the remote 802.11 device, identifying patterns of hostile traffic or other vulnerabilities, and any other information related to the state of detected events.

TABLE 4

WCP configuration packet

WCP | CMD | DATA

The WCP configuration packet (with a TYPE value of 0x03 in an embodiment) depicted in Table 4 updates system configuration information in primary WIDS node 125 and secondary WIDS nodes 120, using 256-bit AES encryption and a preloaded customer key. The preloaded customer key is a unique key for each customer that is loaded into WID collector 110 and WID nodes 120. It is used to encrypt all WCP configuration packets (except those that contain the "enter configuration mode" command). The configuration packets can contain updated system configuration information, drivers, firmware, kernels, and applications. The WCP field in the WCP diagnostic packet contains a WCP generic packet, as described above, to provide the basic information to the recipient of the packet.

The CMD field in the WCP configuration packet is a 4-bit value that contains commands to be executed by the receiving unit (i.e., the WIDS nodes). In an embodiment, the commands with the values 0x0 and 0xF are reserved values.

Numerous commands can be implemented in WCP for performing a number of different functions within the WID nodes. The current command set includes the following:

AES KEY EXCHANGE

Value for CMD field: 0x01

Data:
   256-bit session key for use in the AES algorithm to encrypt communications between the secondary WIDS nodes and primary WIDS node, and between the primary WIDS node and the collector.

Time-to-live (TTL) value, which, in an embodiment, is a standard UNIX timestamp. The use of an exact timestamp rather than a traditional time to live value (i.e., a value the merely indicates when use of a particular key is to cease) accounts for possible drift between different clocks in WID collector 110 and WID nodes 120. For example, WID nodes may experience up to a 1/20th second clock drift per 15 minute polling period.

SYSTEM CONFIGURATION

Value for CMD field: 0x03

Data: Packet payload may include command scripts and binary data to update system configuration, drivers, firmware, and other system software.

If the session between primary WIDS node 125 to WIDS collector 110 is disrupted, the WIDS collector broadcasts a Network Reset and indicates error condition on Console. If WIDS collector 110 issues a System Update, primary WIDS node 125 issues Network Reset broadcast to all Nodes. WIDS collector 110 issues a packet of type configuration with command System Update to primary WIDS node 125 to initiate replacement or modification of system configuration data, binaries, device firmware, or other WIDS components as is apparent. In one embodiment, primary WIDS node 125 issues a Key Reset command in a packet of type configuration broadcast to all nodes. Those nodes which receive a Key Reset complete transfer of pending diagnostic or event data, and revert to a system state awaiting packets of type configuration encrypted with a unique pre-loaded customer key. Primary WIDS nodes receive system update information from WIDS collector 110 and transmit it to the WIDS nodes 120 for integrity verification and subsequent implementation of system updates.

Figure 4:
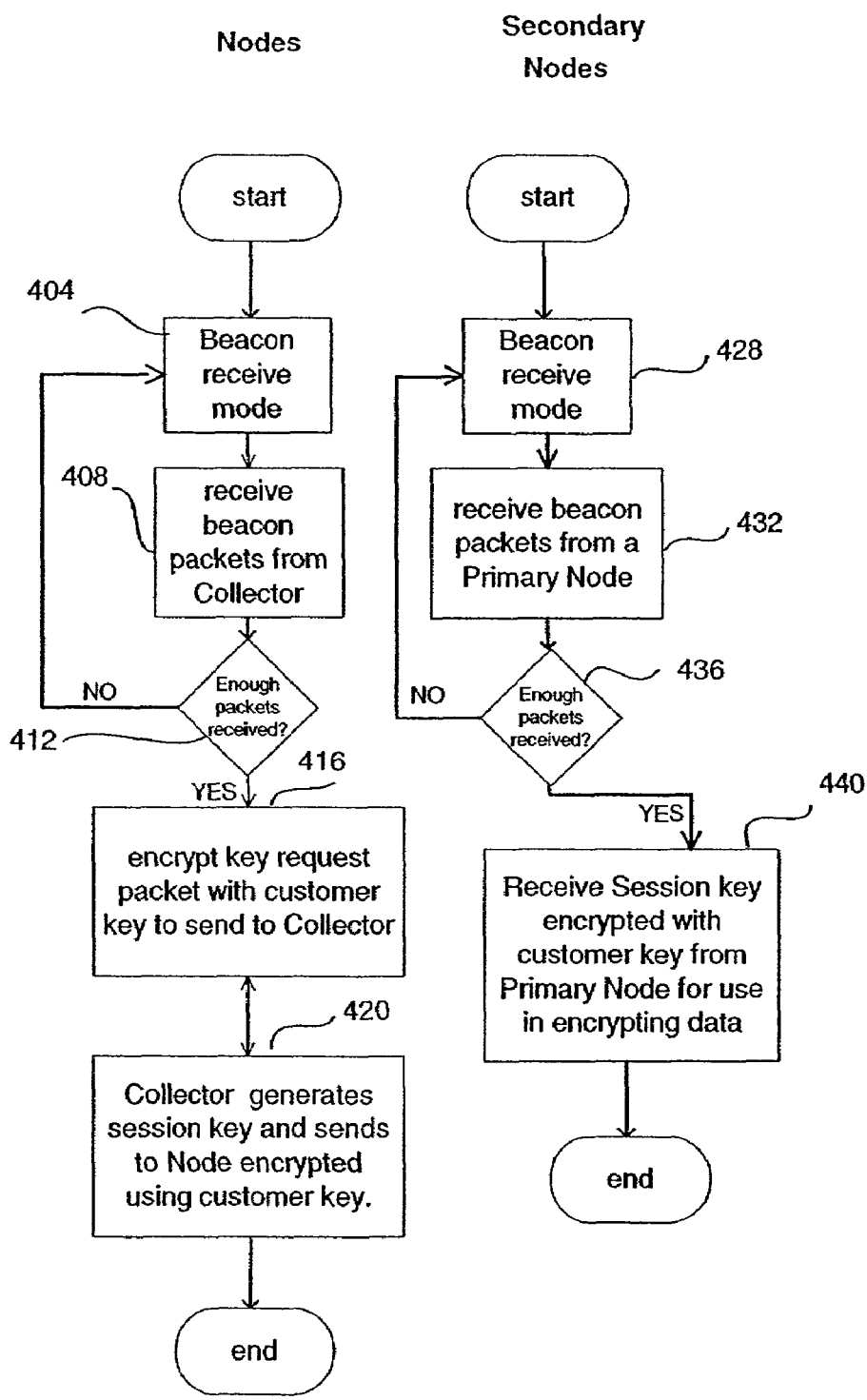
FIG. 4 is a flow chart of the initialization process of a WIDS node.

FIG. 4 is a flow chart of the initialization process of a WIDS node. Upon power up, all WIDS nodes enter a beacon receive mode 404 or 428, wherein they wait to receive beacon packets from the WIDS collector. A WIDS collector provides a periodic beacon signal (consisting of one or more beacon packets) to allow the WIDS nodes to determine (a) their proximity to the WIDS collector and (b) the best routes to the WIDS collector, as determined by the ability of a WIDS node to correctly receive a predefined number of beacon packets. In an embodiment, this beacon signal is sent at a predefined interval to a network broadcast address for a predefined duration after startup, as would be apparent. The beacon signal is a UDP packet sent to the radio network broadcast address containing a 32-bit UNIX timestamp value with appended cryptographic checksum.

Upon receiving a beacon packet, a WIDS node unpacks the first portion of the packet, generates a cryptographic checksum of the data, and compares to checksum value retrieved from the packet. If the checksum calculated by the WIDS node matches that extracted from the beacon packet, the WIDS node can determine its logical proximity to the WIDS collector. In most properly designed networks, at least one WIDS node will be able to receive error-free beacon packets within the allocated time.

Initially, all WIDS nodes have the same status (i.e., none are identified as the primary WIDS node until after the initialization process). The WIDS node (or, in some configurations, multiple WIDS nodes) are designated as primary WIDS node(s). As shown in FIG. 4, a WIDS node that ultimately becomes designated as a primary WIDS node enters beacon receive mode at a step 404 (although at this point it has the same status as all other WIDS nodes) and loops through a step 408 and a step 412 while waiting to receive a predetermined number of beacon packets from the WIDS collector. Similarly, the rest of the WIDS nodes enter beacon receive mode at a step 428 and loop through a step 432 and a step 436 while waiting to receive a predetermined number of beacon packets from a primary WIDS node. While in beacon receive mode, the WIDS nodes determine their own radio network routing based on their ability to receive an error-free beacon packet from another device in the WID system (whether it is a WIDS collector or another primary WIDS node logically closer to the WIDS collector).

Upon receiving a predetermined number of beacon packets from the WIDS collector, the primary WIDS node sets its system time to the timestamp value from the final beacon packet received from the WIDS collector and sets its default route to the IP address of the WIDS collector. The primary WIDS node then sends a beacon confirm signal to the WIDS collector. Next, the primary WIDS node encrypts a key request packet with the preloaded customer key and sends to the WIDS collector in a step 416. In an embodiment, the encryption used in step 416 is 256-bit AES encryption. At a step 420, the WIDS collector, in response to the request sent by the primary WIDS node in step 416, generates a session key and encrypts it using the preloaded customer key. The encrypted session key is then sent to the primary WIDS node.

The secondary WIDS nodes, after receiving a predetermined number of beacon packets from a primary WIDS node, receive in a step 440 a session key encrypted with the preloaded customer key from the primary WIDS node. Once decrypted, a primary WIDS node can communicate securely with the secondary WIDS nodes.

The initialization process within a WID system utilizes, in one embodiment, a WIDS beacon protocol (WBP) to accomplish the initialization described above. The WBP utilizes the User Datagram Protocol (UDP) to send packets to an out-of-band IP network broadcast address. As described above with respect to FIG. 4, the WBP is used to (a) establish primary WIDS node 125, (b) determine the best route for communications between the primary WIDS node and the WIDS collector, and (c) provide a periodic timestamp synchronization signal for the WIDS nodes.

TABLE 5

Beacon packet

| IP | UDP | SYS | TIME |

The current WBP has one packet type, known as the beacon packet type. As shown in Table 5, the beacon packet contains a standard IP and UDP field, as would be apparent.

The SYS field in the beacon packet is a 1-bit value that contains a binary flag set to indicate whether the beacon source is a WIDS collector (in which case the bit is set to 1) or primary WIDS node (in which case the bit is set to 0). If a WIDS node determines that the beacon source is a WIDS collector (SYS=1), that is the indication to that WIDS node that it is the primary WIDS node.

The TIME field in the beacon packet ensures that each packet has a timestamp associated with it. In an embodiment, the value placed in the timestamp field is provided by a UNIX gettimeofday( ) command that is read from userland, but has the timezone information stripped from it.

Figure 5:
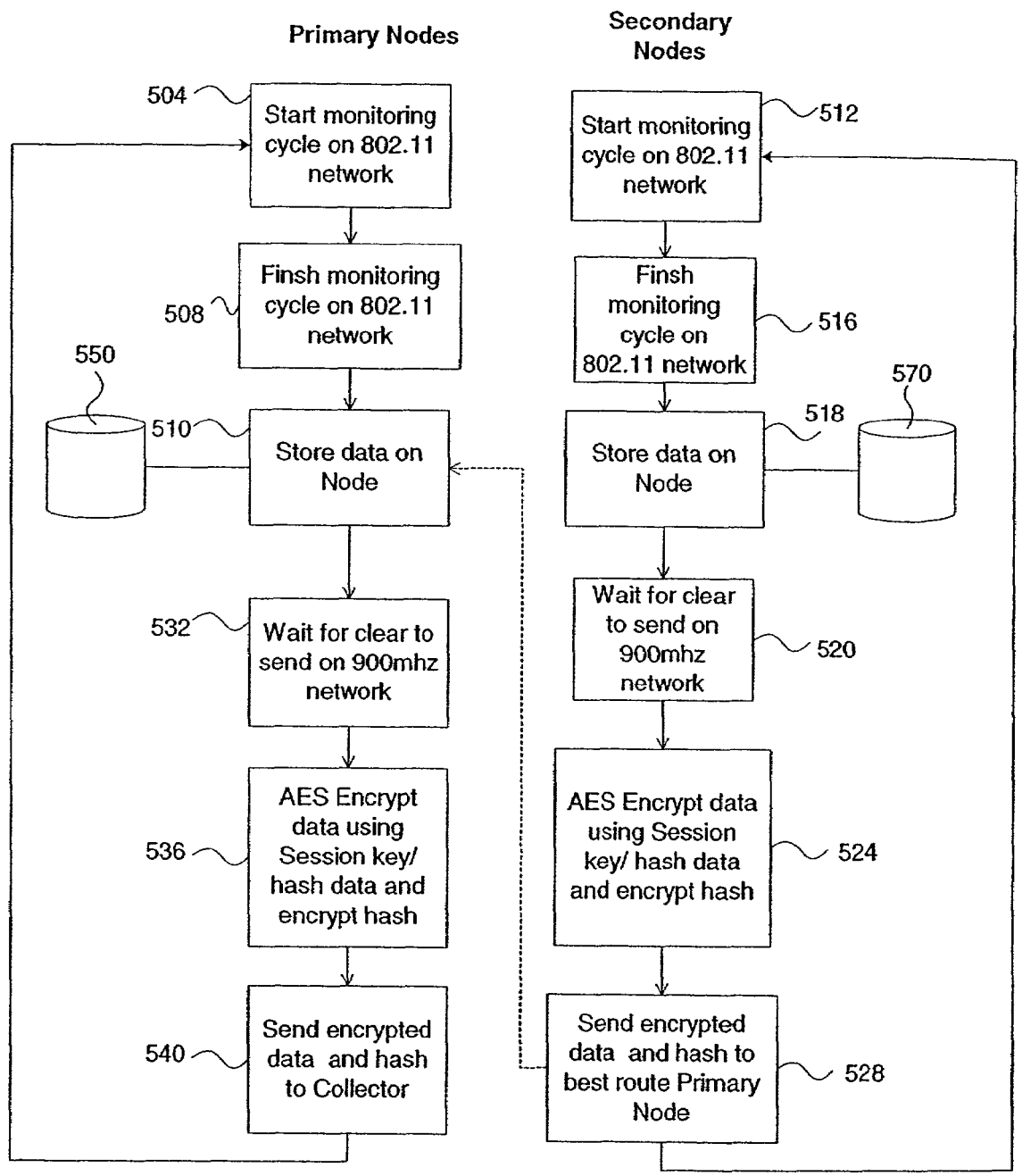
FIG. 5 is a flow chart of the operations of a WIDS node.

FIG. 5 is a flow chart of the operations of a WIDS node, which shows the operation of a WID system after initialization. In a step 504, the primary WIDS node begins a monitoring cycle. A monitoring cycle involves receiving 802.11 packets that have been broadcast over one or more 802.11 networks. In a step 508, the primary WIDS node completes its monitoring cycle and, in a step 510, stores the results of the monitoring in memory 550 within the primary WIDS node.

Similarly, in a step 512, each secondary WIDS nodes begins a monitoring cycle, receiving 802.11 packets that have been broadcast over one or more 802.11 networks. In a step 516, each secondary WIDS node completes its monitoring cycle and, in a step 518, stores the results of the monitoring in memory 570 within the secondary WIDS node. The secondary WIDS nodes then wait for a clear to send indication in a step 520. Once a clear to send indication has been received, the secondary WIDS nodes retrieve from memory 570 the stored data from the completed monitoring cycle, hash the data, and encrypt the data and hash in a step 524 using the session key. Once encrypted, the encrypted data and hash are sent to the primary WIDS node in a step 528.

Figure 6:
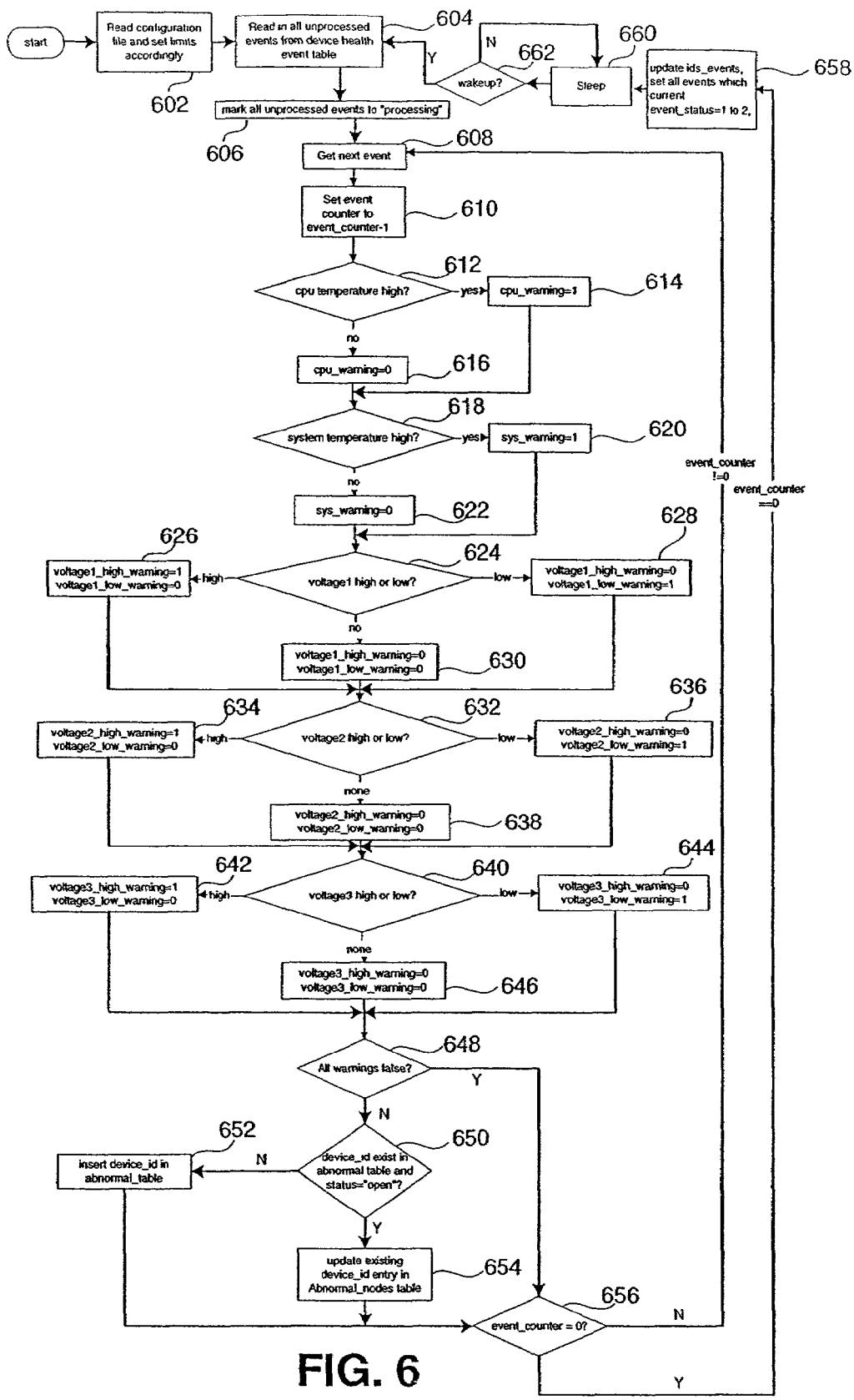
FIG. 6 is a flow chart of the health event processing of a WIDS node.

FIG. 6 is a flow chart of the health event processing of a WIDS node. The health event processing occurs in the WIDS collector on an ongoing basis. The health event processing consists of a number of different checks of various system values against predetermined criteria. During initialization (i.e., after power up), the WIDS collector will read a configuration file in a step 602. Based on the configuration file, the WIDS collector will set various limits against which system measurements will be tested. In a step 604, all unprocessed events from a device health event table will be read in to the working memory of the WIDS collector. The device health event table contains information on all aspects of the operation of each WIDS node. Any events that occur at any of the WIDS nodes that are outside of the limits described above will be identified and stored in the device health event table.

In a step 606, a loop is entered in which the first step is to mark any events that are unprocessed as being processed. The next event to be processed is fetched in a step 608 and a counter that keeps track of events is decremented in a step 610. As a first check, the CPU temperature of a WIDS node is checked in a step 612. If the temperature is too high, a cpu_warning flag is set to a logic value one (corresponding to true) in a step 614. Otherwise, the cpu_warning flag is set to a logic value zero (corresponding to false) in a step 616.

Next, the system temperature of the WIDS node is checked in a step 618. If the temperature is too high, a sys_warning flag is set to a logic value one (corresponding to true) in a step 620. Otherwise, the sys_warning flag is set to a logic value zero (corresponding to false) in a step 622.

The three voltage levels (3.3V, 5.0V, and 12.0V) are then checked in steps 624, 632, and 640. If any of the voltages are too high, a voltagex_high_warning flag is set to a logic value one and a voltagex_low_warning flag is set to a logic value zero at steps 626, 634, or 642 (where voltagex refers to voltage1, voltage2, or voltage3, as would be apparent). Similarly, if any of the voltages are too low, the voltagex_low_warning flag is set to a logic value one and a voltagex_high_warning flag is set to a logic value zero at steps 628, 636, or 644. In the event that any of the voltages are within normal range, the voltagex_low_warning flag is set to a logic value zero and the voltagex_high_warning flag is set to a logic value zero at steps 630, 638, or 646.

If the WIDS collector determines at a step 648 that all warning flags are not false (i.e., there are warnings somewhere in the system), a check is then made in a step 650 of whether the WIDS collector is already aware of the potential problem by checking to see if the device_id already exists in an abnormal_table that tracks system problems. If so, the abnormal_table is simply updated in a step 654. If the device_id does not exist in the abnormal_table already, an entry is created in a step 652.

At a step 656, a determination is made by the WIDS collector of whether any more events need to be processed by checking if the event_counter has counted to 0. If it has, the ids_events table is updated in a step 658 and the WIDS node then enters a sleep mode in a step 660. The WIDS node continues in sleep mode through checks in a step 662 of whether it needs to wake up. If it does need to end sleep mode, it enters the loop again at step 604. If, however, the check of the event counter in step 656 indicates that there are still events to process, the loop continues with the next event being retrieved in step 608.

Figure 7:
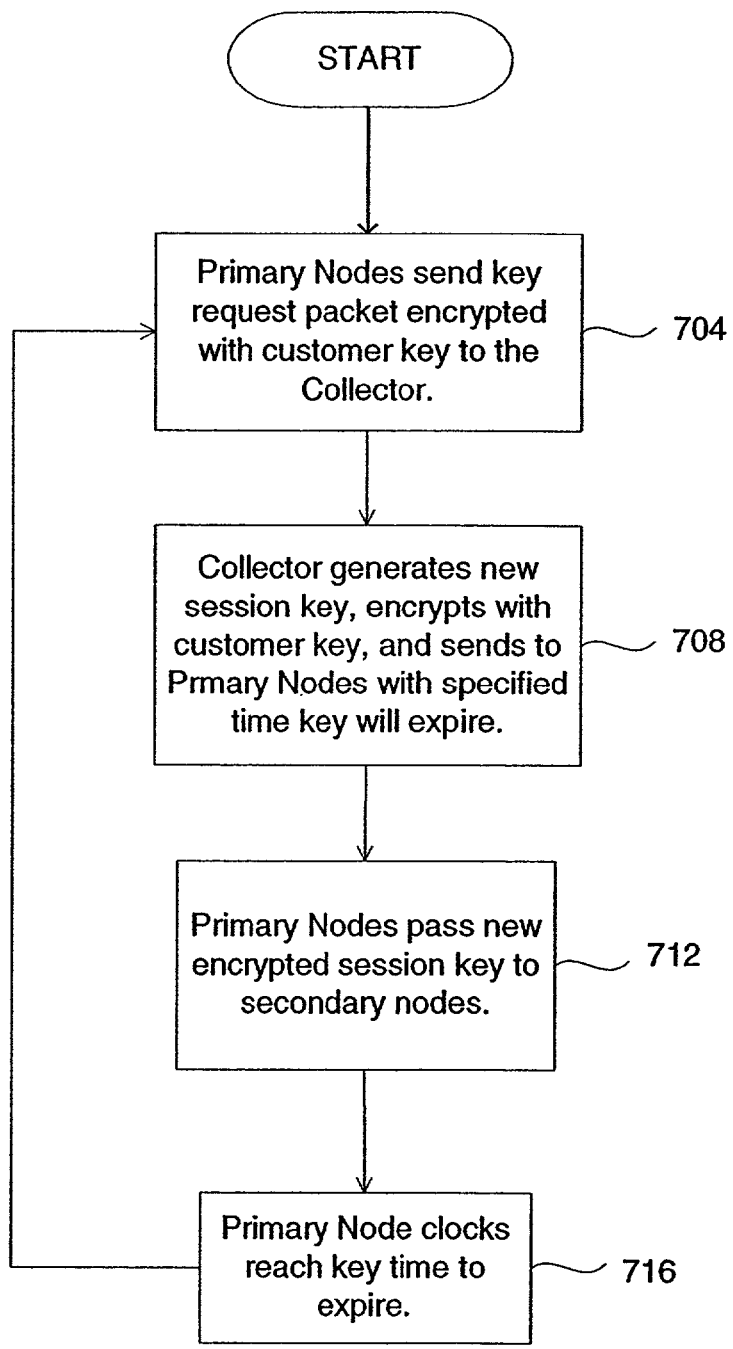
FIG. 7 is a flow chart of a session key update process in a WID system.

FIG. 7 is a flow chart of a session key update process in a WID system. In a step 704, a primary WIDS node sends a configuration packet of type Key Request to the WIDS collector. The WIDS collector generates a single Session Key with a specified, limited lifetime. The WIDS collector then encrypts the session key in the preloaded customer key and transmits the encrypted session key to a primary WIDS node in a step 708.

During initialization, additional processing takes place to transmit the encrypted session key to the secondary WIDS nodes. First, the primary WIDS node enters beacon transmit mode. The secondary WIDS nodes select a "best path" based on the source of the first error-free beacon packet they receive. If the decryption of the session key (that was encrypted with the preloaded customer key) fails at initialization (for example, due to the wrong key loaded in pre-deploy configuration), an alert condition is sent to WIDS collector and presented on the management console.

In both initialization mode and session key update mode, the primary WIDS node passes the encrypted session key and configuration data to each secondary WIDS node in a step 712. The primary WIDS node then sends confirmation to the WIDS collector that all secondary WIDS nodes received the session key or indicates an error condition if there were unresponsive nodes. In a step 716, the primary WIDS node monitors the expiration of the session key and, when this occurs, begins the loop again at step 704.

Figure 8:
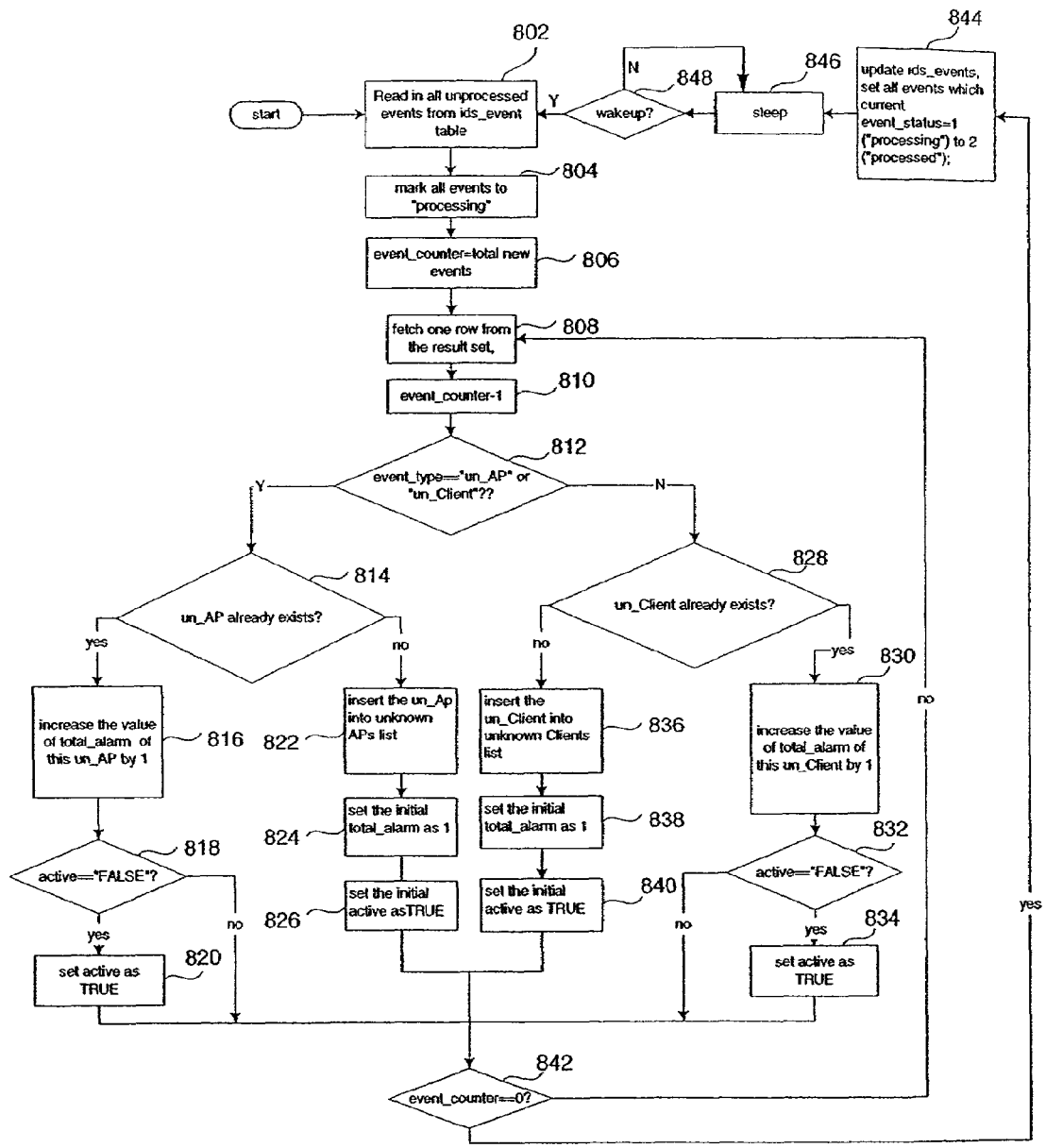
FIG. 8 is a flow chart of intrusion detection processing in a WID system.

FIG. 8 is a flow chart of intrusion detection processing in a WID system. This processing occurs in the WIDS collector, after the data is collected from the secondary WIDS nodes by a primary WIDS node and passed to the WIDS collector. In a step 802, all unprocessed events from an IDS events table will be read in to the working memory of the WIDS collector. The IDS events table contains information on all anomalous events that have been detected by each WIDS node, each such event being considered an IDS event. Any detected events that occur at any of the WIDS nodes that are indicative of either an unauthorized access point or an unauthorized client of the wireless network will appear as an IDS event in the IDS events table.

In a step 804, a loop is entered in which the first step is to mark all IDS events as being processed. In a step 806, an IDS events counter is set equal to the total number of new events loaded in step 802. The next IDS event to be processed is fetched in a step 808 and a counter that keeps track of events is decremented in a step 810. In a step 812, the event type is checked to determine whether the currently selected IDS event is due to an unauthorized access point or an unauthorized client.

If the event type flag indicates an unauthorized access point, a further check is made in a step 814 of whether the detected unauthorized access point has already been detected during a previous monitoring cycle. If so, the alarm value for the detected unauthorized access point is increased in a step 816. In a step 818, a determination is made of the status of an active flag, which indicates whether status of any unauthorized access points has changed. If the active flag is false, it is set to true in a step 820.

If, however, the detected unauthorized access point has not been detected during a previous monitoring cycle at step 814, the information on the detected unauthorized access point is placed into an unknown access points list in a step 822. In a step 824, an initial total alarm for the detected unauthorized access point is set to an initial value, where the initial value is 1 in an embodiment. In a step 826, the active flag is set to true.

If the check at step 812 results in a determination that the IDS event is due to an unauthorized client, a further check is made in a step 828 of whether the detected unauthorized client has already been detected during a previous monitoring cycle. If so, the alarm value for the detected unauthorized client is increased in a step 830. In a step 832, a determination is made of the status of an active flag. If the active flag is false, it is set to true in a step 834.

If, however, the detected unauthorized client has not been detected during a previous monitoring cycle at step 828, the information on the detected unauthorized access point is placed into an unknown access points list in a step 836. In a step 838, an initial total alarm for the detected unauthorized client is set to an initial value, where the initial value is 1 in an embodiment. In a step 840, the active flag is set to true.

After processing of the current event (whether unauthorized access point or unauthorized client), a check is made at a step 842 of whether the event counter is zero. If so, the ids_events table is updated in a step 844 and the WIDS collector then enters a sleep mode in a step 846. The WIDS node continues in sleep mode through checks in a step 848 of whether it needs to wake up. If it does need to end sleep mode, it enters the loop again at step 802. If, however, the check of the event counter in step 842 indicates that there are still events to process, the loop continues with the next event being retrieved in step 808.

The WIDS collector 110 data parser trap service reads data from incoming event packets (described above with respect to Table 3) received from the primary WIDS nodes 125 and enters the data into the IDS_Events table of the database. When the record is written, the Node device_id and the event_type are derived by the trap service and included. The event_status is null for new events; once the events are processed (FIG. 8), the event_status is changed to reported. Node health data from the Diagnostic packets (described in Paragraph 1047) are parsed by the trap service and written to the Device_Health_Events table with the derived device_id for that Node. This information is used by the health event process flow in FIG. 6 to fill the abnormal_nodes table.

Figure 9:
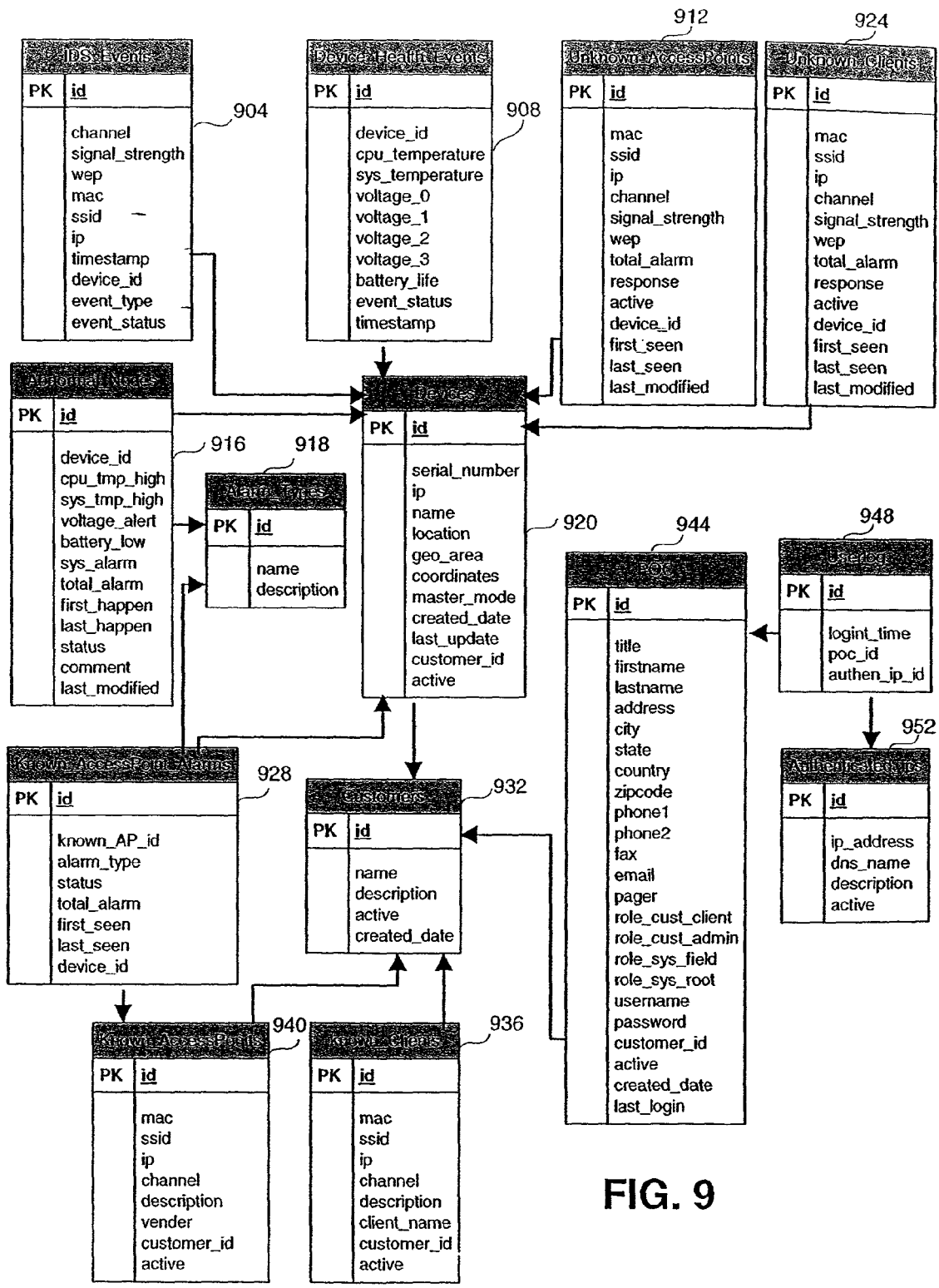
FIG. 9 depicts the schema of a back end database in a WID system.

FIG. 9 depicts the schema of a back end database in a WID system. Each schema utilizes an identification (or id) field as its primary key. Furthermore, each schema contains a number of fields that describe various aspects of the WID system. Each schema is described with respect to the following tables.

TABLE 6

IDS Events

| Element | Description |
| --- | --- |
| id | an auto increment number used as primary key for the event |
| channel | primary data from WIDS node |
| signal_strength | primary data from WIDS node |
| wep | primary data from WIDS node |
| mac | primary data from WIDS node |
| ssid | primary data from WIDS node |
| timestamp | primary data from WIDS node |
| device_id | from trap service |
| event_type | set by trap service (e.g., 0 for access point, 1 for client) |
| Event_status | Will be set to 0 (null) when created by trap service. As events process sweep is initiated, it will be set to 1 (processing). After processing is finished, it will be set to 2 (reported). |

Table 6 defines the data fields contained in the IDS_Events schema 904 shown in FIG. 9, including the channel and signal strength of the particular WIDS node, along with information on WEP, the MAC address, and the SSID of the WIDS node. IDS_Events also includes a timestamp of the event, a device_id value from the trap service, the type of event that has occurred, and the event status.

TABLE 7

Device_Health_Events 4

| Element | Description |
| --- | --- |
| id | an auto increment number as primary key |
| device_id | from trap service |
| cpu_temperature | primary data from WID |
| sys_temperature | primary data from WID |
| voltage_0 | primary data from WID |
| voltage_1 | primary data from WID |
| voltage_2 | primary data from WID |
| voltage_3 | primary data from WID |
| battery_life | primary data from WID |
| timestamp | primary data from WID |

Table 7 defines the data fields contained in the Device_Health_Events schema 908 shown in FIG. 9, including a device_id value from the trap service, values related to the health status of the WIDS node, and a timestamp value. The health status values can include, for example, the CPU temperature, the system temperature, various voltage values, and the battery life.

TABLE 8

Unknown_AccessPoints

| Element | Description |
| --- | --- |
| id | an auto increment number as primary key |
| mac | the mac of unknown Access Point |
| ssid | the ssid of unknown Access Point |
| ip | the ip address of unknown Access Point |
| channel | the channel this unknown Access Point went though |
| signal_strength | the signal strength of the unknown Access Point that the WID detected |
| wep | the encryption bits this unknown Access Point used |
| total_alarm | count the total occurrences of a unknown Access Point which has the same mac, ssid, ip, channel, wep, device_id |
| response | will be filled by users when a proper action has been done |
| active | When a new Access Point is discovered and entered, active==True. The user can change the active==false if the access point is no longer visible. Once the new ids events report this unknown Access Point again, it will be active==true again. |
| device_id | comes from backend process |
| first_seen | The first time when this unknown Access Point was detected by WID |
| last_seen | The last time when this unknown Access Point was detected by WID |
| last_modified | The last time when this unknown Access Point record was modified in the table to track the date of any modification of this unknown AP |

Table 8 defines the data fields contained in the Unknown_AccessPoints schema 912 shown in FIG. 9, which are filled by a backend sweep process at the WIDS collector. This process checks the new IDS events and adds new unknown access points to the database according to the above schema. Information about the unknown access points that is entered into the database can include the MAC address, SSID, IP address, channel, signal strength, and WEP status. In addition, information about the status of the actions related to the unknown access points can be entered into the database, including the total number of times the same access point has been detected, the response taken, and whether the unknown access point is active. In addition, the database entry for unknown access points can contain the device ID of the WIDS node, the time it was first and last seen by a WIDS node, and the last time the particular unknown access point entry in the database was modified.

TABLE 9

Unknown_Clients

| Element | Description |
| --- | --- |
| id | an auto increment number as primary key |
| mac | the mac of unknown Client |
| ssid | the ssid of unknown Client |
| ip | the ip address of unknown Client |
| channel | the channel this unknown Client went though |
| signal_strength | the signal strength of the unknown Client that the WID detected |
| wep | the encryption bits this unknown Client used |
| total_alarm | count the total occurrences of a unknown Client which has the same mac, ssid, ip, channel, wep, device_id |
| response | will be filled by users when a proper action has been done |
| active | When a new Client is discovered and entered, active==True. The user can change the active==false if the Client is no longer visible. Once the new ids events report this unknown Client again, active==true again. |
| device_id | comes from backend process |
| first_seen | The first time when this unknown Client was detected by WID |
| last_seen | The last time when this unknown Client was detected by WID |
| last_modified | The last time when this unknown Client record was modified in the table to track the date of any modification of this unknown AP |

Table 9 defines the data fields contained in the Unknown_Clients schema 924 shown in FIG. 9, which are filled by a backend sweep process at the WIDS collector. This process checks the new IDS events and adds new unknown clients to the database according to the above schema. Information about the unknown clients that is entered into the database can include the MAC address, SSID, IP address, channel, signal strength, and WEP status. In addition, information about the status of the actions related to the unknown clients can be entered into the database, including the total number of times the same client has been detected, the response taken, and whether the unknown client is active. In addition, the database entry for unknown clients can contain the device ID of the WIDS node, the time it was first and last seen by a WIDS node, and the last time the particular unknown client entry in the database was modified.

TABLE 10

Devices

| Element | Description |
| --- | --- |
| id | An auto increment number as primary key |
| serial_number | the WIDS node's serial number |
| ip | the ip address of the WIDS node |
| name | the descriptive name of the WIDS node |
| location | describes the geographic position of the WIDS node |
| geo_area | some description of the area of this WIDS node (Note that the range of area will be wider than the location. Some WIDS nodes may stay in the same area with different location.) |
| coordinates | the data of this WIDS node's coordinates format like (x, y) from GPS. |
| master_mode | if this WIDS node is a primary WIDS node, this field will be 1, otherwise it will be 0 |
| create_date | the first time when the device registered, it will be stored into this table as the create date |
| last_update | the last time when the record of the device been modified, it will be recorded as the date of last update |
| customer_id | this field tells which customer this WIDS node belongs to |
| active | used for device management to maintain the current devices as ACTIVE, the historical devices as NOT ACTIVE |

Table 10 defines the data fields contained in the Devices schema 920 shown in FIG. 9, which contains data elements related to each WIDS node. This can include, for example, the IP address of the WIDS node, along with the name, location, geographic area, and coordinates of the WIDS node. The Devices schema can also include an indication of whether the entry is a primary WIDS node, the creation date (i.e., the date the WIDS node was put into service), the date of the last update of the WIDS node, an identification of the customer, and a flag to indicate whether the WIDS node is currently active.

TABLE 11

Abnormal_Nodes

| Element | Description |
| --- | --- |
| id | an auto increment number as primary key |
| device_id | the foreign key that points to the Devices table which this abnormal device belongs |
| cpu_tmp_high | the alarm flag to show the Node's CPU temperature going too high(Boolean variable) |
| sys_tmp_high | the alarm flag to show the Node's system temperature going too high(Boolean variable) |
| voltage_alert | the alarm flag to show the Nodes' voltage going to alert level (Boolean variable) |
| battery_low | the alarm flag to show the battery's life going to be end level |
| sys_alarm | this is a foreign key to point to Alarm_Types table, right now there are two types (they are: device down, device's configuration changed). Note, this filed will be filled by other process when the alarm WID is still active, this field will be updated once any one of the alarms is raised, otherwise it will insert a new alarm record for this device |
| total_alarm | before the status of this record is "CLOSED," the total_alarm will accumulate the occurrences of the alarm once no matter what kind of alarm or alert it has |
| first_happen | the first time this record is created |
| last_seen | the last time the event process updates this record |
| status | this is a flag to see if this abnormal device report record has been responded to or not, if yes the record will be marked as "CLOSED" |
| comment | the user may add some comment for this record before the record is closed |
| last_modified | marks the last time when the record was updated |

Table 11 defines the data fields contained in the Abnormal_Nodes schema 916 shown in FIG. 9, which contains data elements related to any WIDS nodes that have indicated any problems. This schema can include, for example, WIDS nodes that have temperatures that are too high or voltages that are too high or too low. The data fields in this schema can include the device ID, flags indicating the problem being experienced by the WIDS node, various alarm indicators, the time of the first event being recorded, the time of the last time the event was recorded, the status of any responses to previous alarm indicators, a comment, and an indication of the last time that the abnormal WIDS node entry in the database was modified.

TABLE 12

Alarm_Types

| Element | Description |
|---|---|
| id | an auto increment number as primary key |
| name | the name of the alarm type, so far have "Device_down", "Config_Changed" |
| description | the description of the alarm type; |

Table 12 defines the data fields contained in the Alarm Types schema 918 shown in FIG. 9, which contains data elements related alarms. This can include, for example, the name of the alarm type and its description.

TABLE 13

Known_AccessPoint_Alarms

| Element | Description |
|---|---|
| id | an auto increment number as primary key |
| alarm_type | the FK of the table which points to the Alarm_Types table to see what type of alarm this record is |
| status | this is a flag to see if this record has been CLOSED or still OPEN |
| total_alarm | accumulates the occurrences of the same Known AP's alarm |
| first_seen | marks the first time when this alarm was detected |
| last_seen | marks the last time when this alarm is detected |
| device_id | which device detected this alarm |

Table 13 defines the data fields contained in the Known_AccessPoints_Alarms schema 928 shown in FIG. 9, which contains data elements related to alarms for known access points. This can include, for example, the type of the alarm, the status of the particular record associated with the alarm, the total number of alarms for the same known access point, the time of the first alarm being recorded, the time of the last time the alarm was recorded, and the WIDS node that detected the alarm.

TABLE 14

Known_AccessPoints

| Element | Description |
|---|---|
| id | an auto increment number as primary key |
| mac | the mac of the Access Point |
| ssid | the ssid of the Access Point |
| ip | the ip address of the Access Point |
| channel | the channel this Access Point uses |
| description | Any useful information about the Access Point |
| vendor | the vendor of this known Access Point |
| customer_id | which customer owns this Access Point |
| active | if the known Access Point is no longer exist it will be NOT ACTIVE, otherwise it will be ACTIVE |

Table 14 defines the data fields contained in the Known_AccessPoints schema 940 shown in FIG. 9. Information about the known access points that is entered into the database can include the MAC address, the SSID, the IP address, the channel used by the known access point, a text description, a field identifying the customer that owns the known access point, and a flag indicating whether the known access point is active.

TABLE 15

Known_Clients

| Element | Description |
|---|---|
| id | an auto increment number as primary key |
| mac | the mac of the Client |
| ssid | the ssid of the Client |
| ip | the ip address of the Client |
| channel | the channel this Client uses |
| description | any useful information about the Client |
| client_name | the descriptive name for this Client |
| customer_id | which customer owns this Client |
| active | if the known Client is no longer exist it will be NOT ACTIVE, otherwise it will be ACTIVE |

Table 15 defines the data fields contained in Known_Clients schema 936 shown in FIG. 9. Information about the known clients that is entered into the database can include the MAC address, the SSID, the IP address, the channel used by the known client, a text description, a field identifying the client name, a field identifying the customer that owns the known client, and a flag indicating whether the known client is active.

TABLE 16

Customers

| Element | Description |
|---|---|
| id | an auto increment number as primary key |
| name | the name of the customer |
| description | any useful information about the customer |
| active | if the Customer is no longer exists it will be NOT ACTIVE, otherwise it will be ACTIVE |
| created_date | marks the first time when this customer record is created |

Table 16 defines the data fields contained in Customers schema 932 shown in FIG. 9, which can information such as the name of the customer, a text description, a flag indicating whether the customer exists, and the date the customer record was created.

TABLE 17

POC

| Element | Description |
|---|---|
| id | an auto increment number as primary key |
| title | the title of user |
| firstname | the first name of the user |
| lastname | the last name of the user |
| address | the address of the user |
| city | registration information |
| state | registration information |
| country | registration information |
| zipcode | registration information |
| phone1 | registration information |
| phone2 | registration information |
| fax | registration information |
| email | registration information |
| pager | registration information |
| role_cust_client | if the user is a Customer Client this field will be set as 1 |
| role_cust_admin | if the user is a Customers Admin this field will be set as 1 |
| role_sys_field | if the user is a System Field Engineer this field will be set as 1 |
| role_sys_admin | if the user is a System Root Engineer this field will be set as 1 |

TABLE 17-continued

POC

| Element | Description |
| --- | --- |
| active | if the user is no longer exist, it will be set as NOT ACTIVE, otherwise it will be ACTIVE |
| created_date | marks the time when this user record was created |

Table 17 defines the data fields contained in Point of Contact (POC) schema 944 shown in FIG. 9. POC information about the user can include the title, first name, last name, address, phone numbers, a set of flags indicating the role of the user, a flag indicating whether the user exists, and the date the user record was created.

TABLE 18

Authenticated_ips

| Element | Description |
| --- | --- |
| id | an auto increment number as primary key |
| ip_address | the IP address which is legal for accessing the collector application |
| host_name | the host name |
| description | any useful information about the entry |
| active | describes if the authenticated IP is still active or not |

Table 18 defines the data fields contained in Authenticated_ips schema 952 shown in FIG. 9, which is used to store the authenticated Ethernet hosts that can access the web server associated with the wireless network of interest. The entries in the database associated with this schema can include the IP address of the host, the host name, a text description, and a flag indicating whether the host is active.

TABLE 19

Userlog

| Element | Description |
| --- | --- |
| id | an auto increment number as primary key |
| login_time | records each user's login time whenever they logged into the system |
| poc_id | records the user id |
| authen_ip_id | records which remote authenticated host the user came from |

Table 19 defines the data fields contained in Userlog schema 948 shown in FIG. 9, which is used to track the user login data. The entries in the database associated with this schema can include the user's login time, the user's identification, and the host from which the user logged in.

Figure 10:
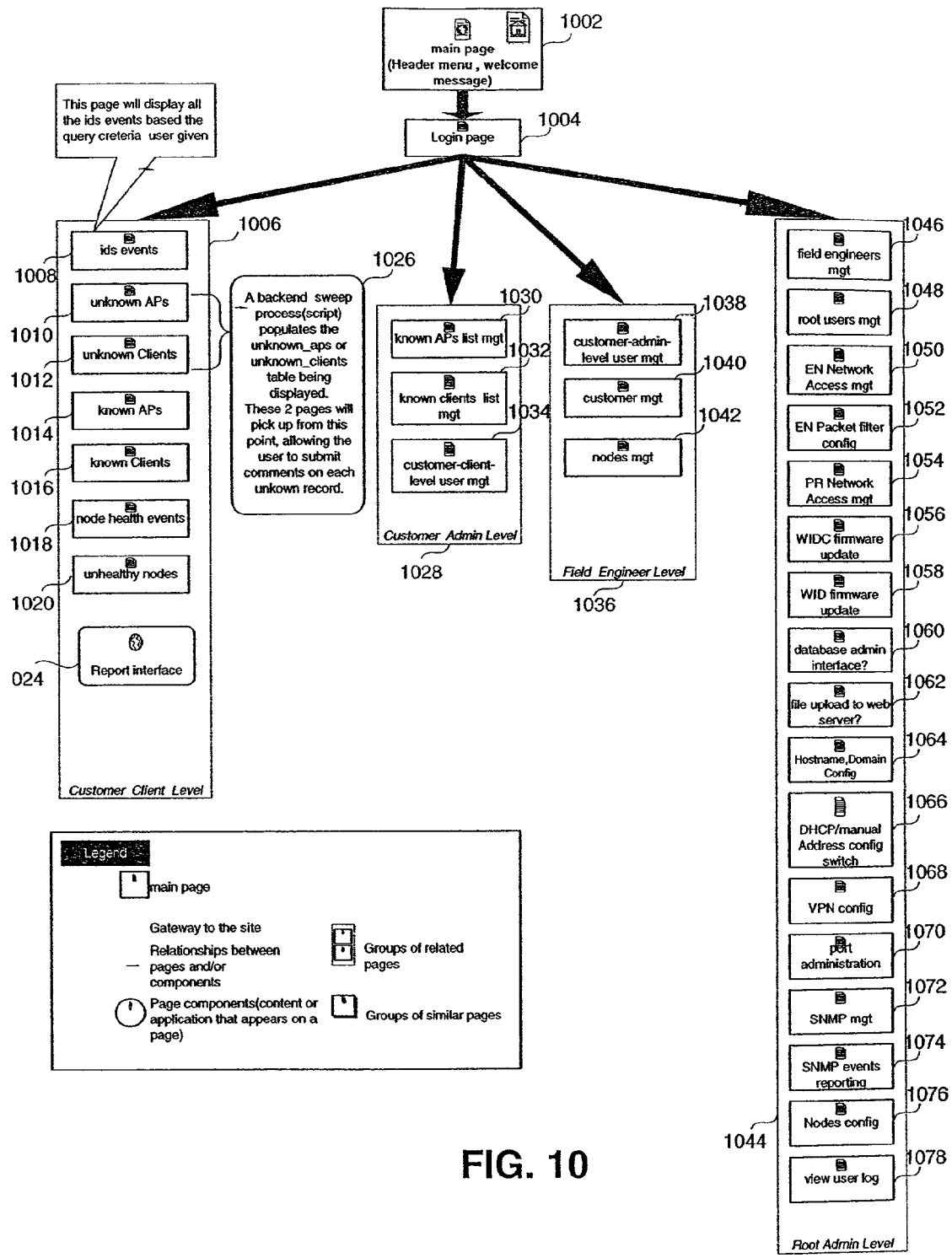
FIG. 10 is a depiction of a web page structure for an implementation of a user interface to a WID system.

FIG. 10 is a depiction of an exemplary structure for an implementation of a user interface to a WID system using the worldwide web. Such a web server interface would allow access to alarm monitoring and system management information contained in the WIDS collector. The interface fully controls system access level to the WIDS collector, and presents to both customers and administrative personnel a well established wireless event monitoring and management center.

The main page, shown as web page 1002, consists of a header menu and a welcome message, along with possibly other introductory information. Web page 1004 is a login page, where various users could access information about the WID system. In an embodiment, a user would login to access the WID system over the Internet. Alternatively, the user could login to access the WID system over a private network, such as a corporate intranet. A user can have one or more authorization levels. In an embodiment, the authorization levels can include a customer client, customer administrator, field engineer, or root administrator. A customer client or customer administrator can be associated with different groups or business units within the customer organization.

After logging in, a user could check on numerous types of information, with the specific information available to each user being dependent on the user's login authorization level.

The system functionalities can be divided into four main areas:

(1) Customer Client Level interface 1006 provides access to the following functions and accessibility:

View IDS events 1008: This page will display all the IDS events. It may contain a criteria form, which, in one embodiment, can include the following database elements: event_type, devices, dayindex, specific mac or ssid, and a list of choice of sorting methods. Additional criteria can be added as necessary.

View unknown access points 1010: This page displays unknown access points and their occurrences, and allows users to fill in the response upon observation and analysis, which allows a user to insert a user comment about that access point. In one embodiment, a popup window could be used to provide this functionality. This page is populated by a sweep of the Unknown_Access-Points table in the database.

View unknown clients 1012: This page displays clients who have attempted access to the wireless network and their occurrences, and allows users to fill in the opinion upon observation and analysis. In one embodiment, a popup window could be used to provide this functionality. This page is populated by a sweep of the Unknown_Clients table in the database.

View known access points 1014: This page displays known access points that belong to the customer and their occurrences.

View known clients 1016: This page displays known clients that belong to the customer and their occurrences.

View WIDS node health status 1018: This regularly updated page displays the current status of all WIDS nodes and indicates any abnormalities detected at any of the WIDS nodes. An abnormal WIDS node report button will allow the user to create a printed report of abnormal WIDS nodes. In an embodiment, this page is updated every five minutes, although the update rate can be adjusted to meet the specific needs of the customer.

View unhealthy WIDS nodes 1020: This page displays unhealthy WIDS nodes that have already been reported to users by the WID system, and provides an update button and several status indicators to allow users to update the status of any unhealthy WIDS nodes.

Report interface 1024: This page allows a customer to create various reports, including, for example, hourly, daily, weekly, or monthly reports. It also allow a customer to generate summaries and graphics indicative of the various data reported by the WID system.

(2) Customer Administrator Level interface 1028 (which includes all of the Customer Client Level privileges described above) provides access to the following additional functions and accessibility:

Known Access Points List Management 1030: This interface allows a customer to add new known access points, or activate/deactivate the currently identified access point in the list of known access points.

Known Clients List Management 1032: This interface allows a customer to add new known clients, or activate/deactivate the currently identified client in the known clients list.

Customer Client Level User Management 1034: This interface allows a customer to control its customer client accounts, including, for example, adding new users, or activating/deactivating a user identified in the point of contact (POC) list associated with the role of customer client.

(3) Field Engineer Level interface 1036 (which includes all of the Customer Client Level and Customer Administrator Level privileges described above) provides access to the following additional functions and accessibility:

Customer Administration Level User Management 1038: This interface allows a field engineer to control customer administrator accounts, including, for example, adding new users, or activating/deactivating a user identified in the point of contact (POC) list associated with the role of customer administrator.

Customer Management 1040: This interface allows a field engineer to add new customers or activate/deactivate the currently selected one in a customer list.

Device Management 1042: This interface allows a field engineer to add new devices or activate/deactivate the currently selected one in a device list.

(4) Root Administrator Level interface 1044 (which includes all privileges described above for the Customer Client Level, Customer Administrator Level, and Field Engineer Level) provides access to the following root level functions and accessibility:

Field Engineers Management 1046: This interface allows a root administrator to add new field engineers or activate/deactivate the current one in the POC list associated with the role of Network field admin.

Root User Management 1048: This interface allows a root administrator to add new root users or activate/deactivate the currently selected one in a POC list associated with the role of root administrator.

Ethernet (EN) Network Access Management 1050: This interface allows input from management console to apply configuration changes to packet filter or firewall configuration. Effect is to limit availability of access to the administrative web server to only authorized hosts or network segments.

EN Packet filter configuration 1052: Collector Ethernet network access controls and restrictions. Input from management console applies configuration changes to packet filter or firewall configuration. Effect is to limit availability of access to the administrative web server to only authorized hosts or network segments.

Packet radio (PR) network access management 1054: 900 Mhz radios implement frequency-hopping and pseudo-random numbers as seed to provide link-level authentication unique to a given deployed network.

WIDS collector firmware update 1056: This interface allows input from the management console to upload firmware upgrades to the collector.

WIDS nodes firmware update 1058: This interface allows input from the management console to upload firmware upgrades to the nodes.

Database administrator interface 1060: This interface allows input from the management console to perform database administration.

Upload new files to web server 1062: This interface allows input from the management console to install files onto the collector web server.

Hostname, Domain configuration 1064: This interface allows input from the management console to change the identification information of the collector.

Network configuration interface (Dynamic Host Configuration Protocol (DHCP) or manual address configuration) 1066: This interface allows input from the management console to configure collector network settings.

VPN Configuration 1068: This interface allows input from the management console to configure Virtual Private Network settings on the collector, if used.

Port administration 1070: This interface allows input from the management console to modify TCP port assignments on the collector to, for instance, assign the web server access on port 4000 instead of 80 (default).

SNMP management 1072: Provides the following services—1) specifies community string; 2) A checking list for appropriate packet filter rules; 3) Cryptographic hash, also display to hint user to enter this into their EMS.

SNMP event reporting 1074: Specifies IP address of SNMP trap loghost (default set as localhost).

Node Configuration 1076: 1) Manual selection of master node; 2) Debug mode toggle.

View userlog data 1078: This interface allows viewing from the management console of the log of collector access attempts by users.

According to the different access levels listed above, a POC table that maintains the roles of users is created in the database depicted in FIG. 9. The POC table allows the WID system to manage the level of access of each user. Via entry of a username and associated password authentication, the corresponding privileges will be granted to each specific user. Attempts to access different levels within the web page that are outside of the specific privileges associated with a user can cause a login window to appear, which will prompt the users to enter additional authentication information to gain the access to a specific level.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   monitoring, for at least one monitoring cycle, a wireless network of interest for a plurality of signals from one or more wireless access devices;
   storing results from the monitoring cycle;
   encrypting the results from the monitoring cycle prior to transmitting to a data collector;
   transmitting the results of the monitoring cycle to the data collector;
   processing the results of the monitoring cycle to determine whether any access of the wireless network of interest has occurred; and
   notifying a user of the results of the processing of the monitoring cycle.

2. The method of claim 1, further comprising:
detecting access points in the wireless network; and
detecting clients in the wireless network.

3. The method of claim 1, further comprising:
using a separate communications channel for the transmission of the results of the monitoring cycle to the data collector.

4. The method of claim 1, further comprising:
performing a monitoring cycle utilizing one or more nodes.

5. The method of claim 4, further comprising:
monitoring the status of the one or more nodes.

6. A method comprising:
monitoring, for at least one monitoring cycle, a wireless network of interest for a plurality of signals from one or more wireless access devices;
storing results from the monitoring cycle;
transmitting the results of the monitoring cycle to a data collector;
processing the results of the monitoring cycle to determine whether any access of the wireless network of interest has occurred;
notifying a user of the results of the processing of the monitoring cycle; and
tracking of authorized and unauthorized access points and clients.

7. The method of claim 6, further comprising:
locating any unauthorized devices.

8. The method of claim 6, wherein the transmitting of results further comprises transmitting over a wireless communications medium.

9. The method of claim 8, wherein the transmitting of results over a wireless communications medium further comprises transmitting a 900 MHz radio transmission.

10. A method comprising:
monitoring, for at least one monitoring cycle, a wireless network of interest for a plurality of signals from one or more wireless access devices;
storing results from the monitoring cycle;
transmitting the results of the monitoring cycle to a data collector;
processing the results of the monitoring cycle to determine whether any access of the wireless network of interest has occurred;
notifying a user of the results of the processing of the monitoring cycle; and
determining the status of any authorized access points.

11. The method of claim 10, further comprising:
determining whether any authorized access points have changed.

12. The method of claim 10, further comprising:
determining whether any authorized access points are not operating.

13. The method of claim 10, wherein the monitoring of signals from one or more wireless access devices further comprises monitoring for clients.

14. A method comprising:
monitoring, for at least one monitoring cycle, a wireless network of interest for a plurality of signals from one or more wireless access devices;
storing results from the monitoring cycle;
transmitting the results of the monitoring cycle to a data collector;
processing the results of the monitoring cycle to determine whether any access of the wireless network of interest has occurred;
notifying a user of the results of the processing of the monitoring cycle; and
identifying any denial of service attempts.

15. The method of claim 14, further comprising:
tracking of multiple connection attempts to the wireless network by any unauthorized devices.

16. The method of claim 14, further comprising:
notifying the user of any unauthorized attempts to access the wireless network.

17. The method of claim 14, wherein the transmitting of results further comprises transmitting to a remotely located data collector.

18. The method of claim 14, wherein the monitoring of signals from one or more wireless access devices further comprises monitoring for access points.

19. A method comprising:
monitoring, for at least one monitoring cycle, a wireless network of interest for a plurality of signals from one or more wireless access devices;
storing results from the monitoring cycle;
transmitting the results of the monitoring cycle to a data collector;
processing the results of the monitoring cycle to determine whether any access of the wireless network of interest has occurred;
notifying a user of the results of the processing of the monitoring cycle; and
tracking how long any unauthorized device has attempted to access the wireless network.

20. The method of claim 19, further comprising:
identifying attempts to spoof an authorized access point.

21. The method of claim 19, further comprising:
notifying the user of any authorized attempts to access the wireless network.

22. A method for controlling a wireless intrusion detection system comprising:
transmitting a plurality of beacon packets from a collector;
receiving one or more of the beacon packets at a node; and
establishing a communications link between the collector and the node for detecting unauthorized access of a wireless network of interest;
wherein the collector controls a wireless intrusion detection system by a communications link that utilizes a different means of communication than the wireless network.

23. A method as in claim 22, the communications link being a 900 MHz radio channel.

24. A method comprising:
receiving, from a node, results, of a monitoring cycle, of a plurality of signals from one or more wireless access devices in a wireless network of interest;
processing the results of the monitoring cycle to generate at least one indicator indicative of unauthorized access to the wireless network of interest,
where the processing comprises applying adaptive learning techniques to evolve recognition of unauthorized access to the wireless network of interest;
recognizing patterns in the results of the monitoring cycle; and
refining responses to the results of the monitoring cycle based on recognized patterns.

25. A method as in claim 24, wherein the applying adaptive learning techniques further comprises:
utilizing genetic algorithms.

26. A system for controlling a wireless intrusion detection system comprising:

means for transmitting a plurality of beacon packets from a collector;

means for receiving one or more of the beacon packets at a node; and means for establishing a communications link between the collector and the node for detecting unauthorized access of a wireless network of interest;

wherein the collector controls a wireless intrusion detection system by a communications link that utilizes a different means of communication than the wireless network.

27. One or more devices that store instructions executable by one or more processors, the instructions comprising:

one or more instructions to transmit a plurality of beacon packets from a collector;

one or more instructions to receive one or more of the beacon packets at a node; and one or more instructions to establish a communications link between the collector and the node for detecting unauthorized access of a wireless network of interest;

where the collector controls a wireless intrusion detection system by a communications link that utilizes a different means of communication than the wireless network.

* * * * *